(12) United States Patent
Schilling

(10) Patent No.: US 11,104,456 B2
(45) Date of Patent: Aug. 31, 2021

(54) SMALL SATELLITE CAPABLE OF FORMATION FLYING, AND FORMATION OF MULTIPLE SMALL SATELLITES

(71) Applicant: Klaus Schilling, Würzburg (DE)

(72) Inventor: Klaus Schilling, Würzburg (DE)

( * ) Notice: Subject to any disclaimer, the term of this patent is extended or adjusted under 35 U.S.C. 154(b) by 175 days.

(21) Appl. No.: 16/483,786

(22) PCT Filed: Feb. 8, 2018

(86) PCT No.: PCT/EP2018/053218
§ 371 (c)(1),
(2) Date: Aug. 6, 2019

(87) PCT Pub. No.: WO2018/146220
PCT Pub. Date: Aug. 16, 2018

(65) Prior Publication Data
US 2019/0389602 A1    Dec. 26, 2019

(30) Foreign Application Priority Data

Feb. 8, 2017    (DE) ..................... 10 2017 102 481.6

(51) Int. Cl.
*B64G 1/10* (2006.01)
*B64G 1/24* (2006.01)
(Continued)

(52) U.S. Cl.
CPC .......... *B64G 1/1085* (2013.01); *B64G 1/242* (2013.01); *B64G 1/26* (2013.01); *B64G 1/285* (2013.01);
(Continued)

(58) Field of Classification Search
CPC ........ B64G 1/1085; B64G 1/242; B64G 1/26; B64G 1/285; B64G 1/32; B64G 1/366
See application file for complete search history.

(56) References Cited

U.S. PATENT DOCUMENTS

| 6,089,510 A * | 7/2000 | Villani | B64G 1/244 |
| | | | 244/166 |
| 2007/0295865 A1* | 12/2007 | Maini | B64G 1/32 |
| | | | 244/166 |

(Continued)

FOREIGN PATENT DOCUMENTS

| DE | 202005015431 U1 | 4/2006 |
| DE | 102007030994 A1 | 1/2009 |

(Continued)

OTHER PUBLICATIONS

International Search Report (dated Apr. 17, 2018) for corresponding International App PCT/EP2018/053218.
(Continued)

*Primary Examiner* — Justin M Benedik
(74) *Attorney, Agent, or Firm* — WRB-IP LLP

(57) ABSTRACT

The invention relates to small satellites capable to fly in formation (10), in particular nano- or picosatellites with a mass of 10 kg or less, for LEO applications, comprising a housing (12) and at least one plug-in board (14) arranged in the housing (12) with a predetermined functionality and a propulsion system (16) for generating a directed pulse in the direction of the flight trajectory $T_k$.
It is proposed that the small satellite (10) comprises an independent and autonomously working collision avoidance system (18), which is capable of adapting a trajectory correction $T_{kk}$ of the trajectory $T_k$ by the propulsion system (16), when a collision with an object (30) is expected.
In a further independent aspect, the invention relates to a formation (100) composed of several small satellites capable to fly in formation (10), wherein a relative position and flight trajectory $T_k$ of each small satellite (10) is modifiable via the independently and autonomously working collision avoidance system (18).

18 Claims, 14 Drawing Sheets

Figure 1A:
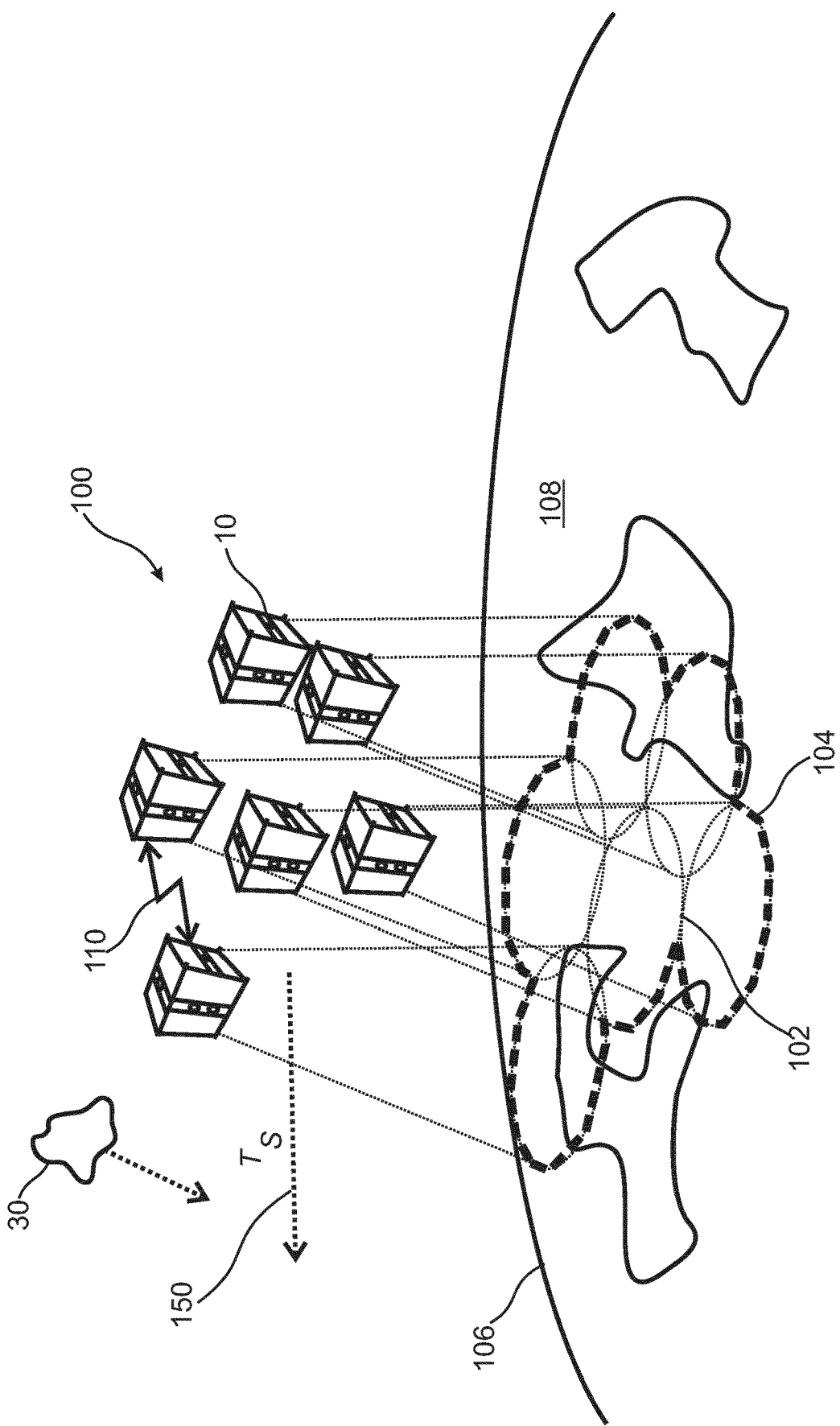

(51) Int. Cl.
*B64G 1/26* (2006.01)
*B64G 1/28* (2006.01)
*B64G 1/32* (2006.01)
*B64G 1/36* (2006.01)

(52) U.S. Cl.
CPC ............... *B64G 1/32* (2013.01); *B64G 1/366* (2013.01); *B64G 2001/245* (2013.01); *B64G 2001/247* (2013.01)

(56) References Cited

U.S. PATENT DOCUMENTS

| | | | | |
|---|---|---|---|---|
| 2009/0222152 | A1* | 9/2009 | Frenkiel | B64G 1/36 701/13 |
| 2010/0032528 | A1* | 2/2010 | Frenkiel | G01S 13/933 244/158.4 |
| 2013/0292517 | A1* | 11/2013 | Briskman | B64G 1/66 244/158.8 |

FOREIGN PATENT DOCUMENTS

| | | |
|---|---|---|
| DE | 102010045232 A1 | 5/2012 |
| EP | 0903487 A2 | 3/1999 |
| EP | 3095713 A1 | 11/2016 |
| JP | H0789497 A | 4/1995 |

OTHER PUBLICATIONS

Acta Astronautica "Fuel consumption and collision avoidance strategy in multi-static orbit dormations" E.F. Jochum et al. from Apr. 1, 2011.

* cited by examiner

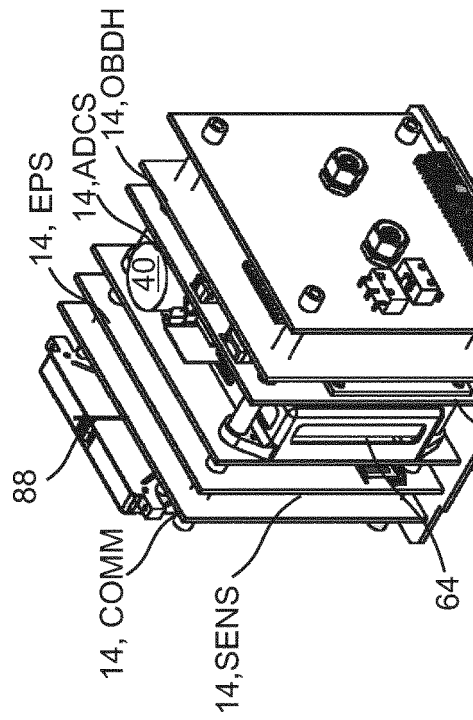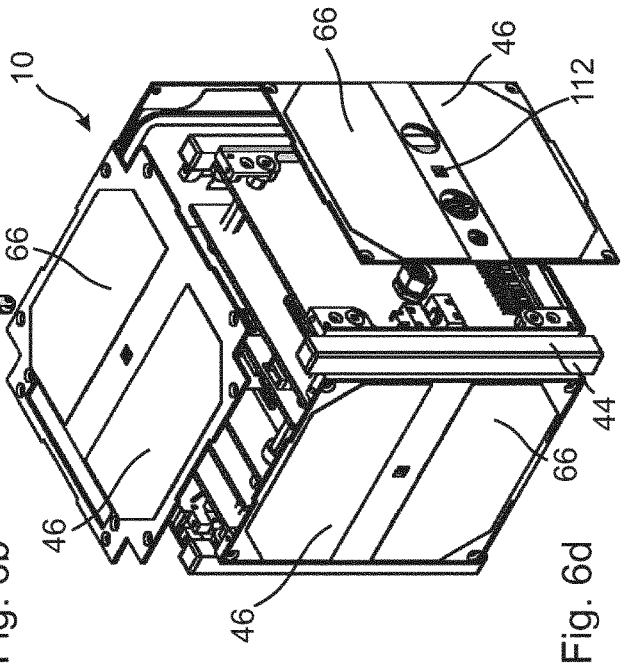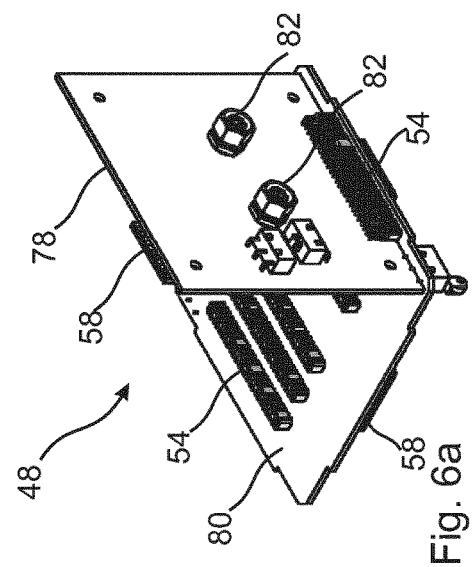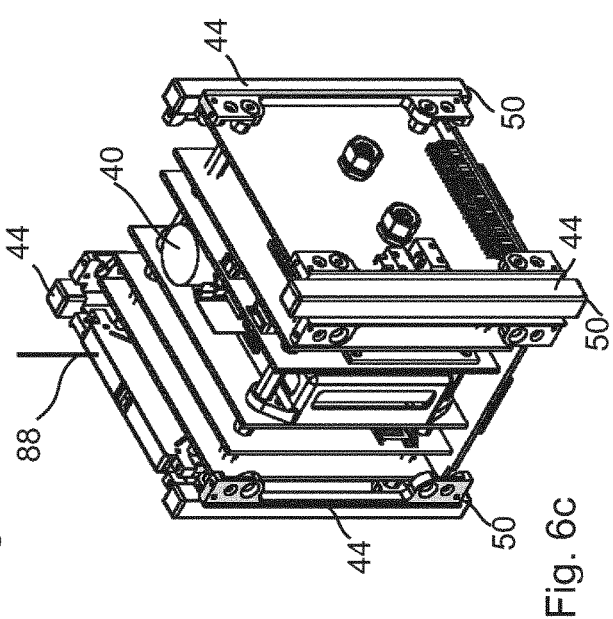

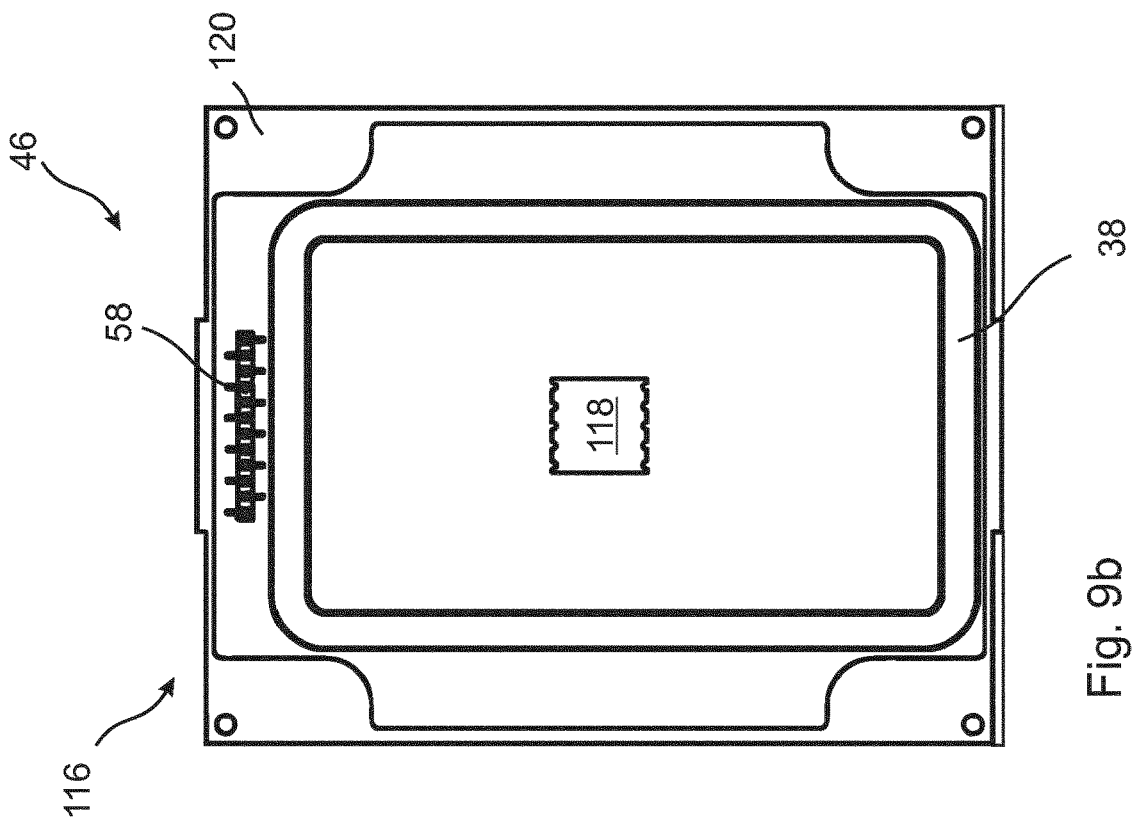
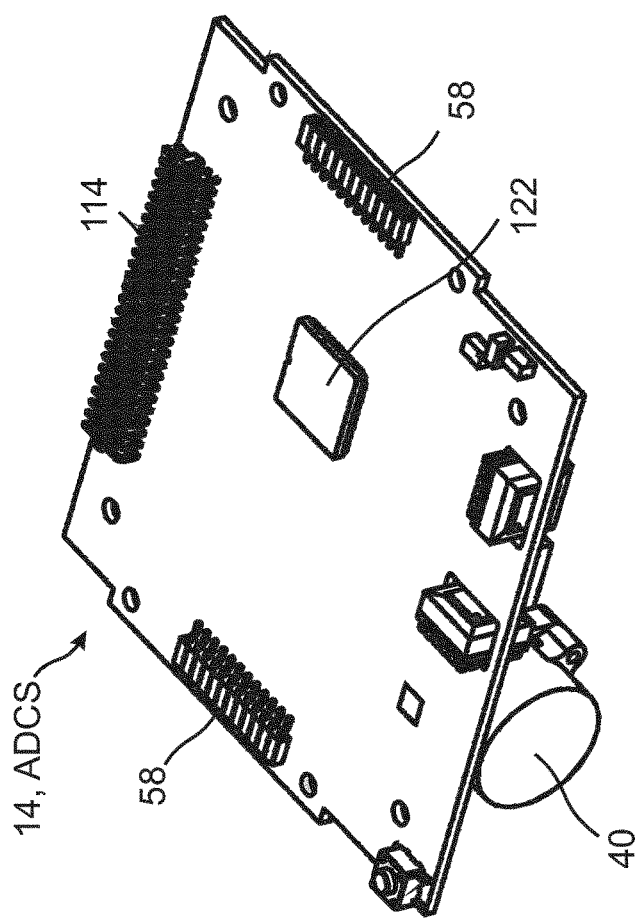
Fig. 9b
Fig. 9a

SMALL SATELLITE CAPABLE OF FORMATION FLYING, AND FORMATION OF MULTIPLE SMALL SATELLITES

The invention concerns very small satellites capable to fly in a formation, in particular a nano- or pico-satellite with a mass of 10 kg or less for LEO (low earth orbit) applications, as well as a formation of several small satellites according to the independent claims.

STATE OF THE ART

Small satellites are known as state-of-the-art since 1957 with the launch of Sputnik-1 at a mass of about 80 kg. Due to extremely fast development of technology, it is today possible to realize small satellites with a launch mass below 10 kg, preferably with a launch mass less than 2 kg, to insert in a low earth orbit (LEO) around Earth, in an altitude between 200 km and maximal 1000 km.

In space technology trends are obvious that traditional large satellites will be complemented by satellite constellations composed of distributed small satellites. These will be placed in low Earth orbits with high inclinations in order to realize satellite systems for global coverage and low latency. In particular, in the vicinity of the poles, the given orbit mechanic leads to particularly high concentration of satellite passages which require detour maneuvers in real-time in order to avoid collisions. The large amount of existing objects from the early period of space flight, that are no longer operational, in combination with the huge quantities of modern distributed satellite systems requires novel approaches to guarantee safe satellite operations in orbit, which are to be patented here.

LEO orbits can be reached by inexpensive launch systems, where the relative velocity of satellites relative to Earth surface to compensate the central gravitational force is significant and thus a approximately 100 minutes are needed to orbit the Earth once. Here radio contact with a ground station above the horizon extends up to maximal 15 min. Generic small satellites LEO are used in particular for Earth or weather observation, for radio broadcasting or for use in a global satellite communication system, as well as for research or technology demonstration. Also, such satellites can be employed for surveillance in military context or for local analysis of Earth's surface, by example for environment monitoring, including observation of storms or flooding.

In LEO satellite formations, multiple satellites are usually deployed in a circular orbit at different locations and utilize symmetry properties. There may be several separated orbital planes offset to each other and occupied by multiple satellites. In particular, Walker constellations are used here very often. Frequently used polar orbit tracks intersect near the poles, thus in the pole region a particularly high risks for collision of satellites in intersecting tracks exist. Each orbit plane may be occupied by one or more satellites. In particular, for communication systems such constellations of satellites with orbits characterized by an inclination between 50° and 100° is of interest (often realized as a Walker-Delta-constellation). In addition, highly elliptical configurations with significant lifetime are often implemented, in which the satellite passes near Earth only in part of its orbit and is remote for the rest.

Recently, the amount of proposed satellite constellations significantly increases for LEO applications. When self-organized control on basis of sensor measurements on-board keeps the satellites in a constant distance topology, this is named a satellite formation. In many cases, a constellation of satellites is used for global coverage, by example in satellite navigation or telecommunication systems, in other cases also for dense local coverage, a cooperating swarm of satellites in near vicinity to cartography and observe the Earth's surface. Thus the Earth surface can be covered homogeneously by a satellite formation with high temporal and spatial resolution.

Small satellites can be realized in serial production, are cost efficient and can be launched in piggy-back with traditional satellites into orbit. End of the nineties by the definition of the CubeSat standard a generic class of pico- and nano-satellites with a launch mass less than 10 kg was defined, which can be employed for many applications. Miniaturization, energy efficiency, modular construction and increasing autonomy of these satellite systems play an important role and are continuously improved.

However, CubeSats are limited in energy supply and in capacity to store fuel for maneuvering. This technology exhibits limited performance and accuracies for the satellite formation. Another crucial aspect is the lifetime of small satellites, as system redundancy can often because of mass limits not be implemented, implying as consequence high failure rates. In particular, crucial deficits are limited fuel and radiation damages, as conventional radiation protection using shielding against hostile space radiation cannot be accommodated in the limited volume. Especially, for satellites with a mass below 2 kg to about 1 kg, redundant systems cannot be installed, such that on a single board typically only one functional system can be accommodated.

Recently, the increase in space debris, but also in the amount of satellite formations, in particular satellite constellations in polar orbits, emphasizes the importance for collision avoidance strategies for miniature satellites. The loss rate by collision with space objects, like space debris, other satellites or satellites in the same formation has significantly increased recently. So far in orbit multi-satellite were almost exclusively realized in form of constellations, in which each satellite is individually controlled from the ground control station. Also, objects in the flight path are detected from ground station and included in the path planning. However, for about 90% of the orbital period there is no contact to the ground station, therefore for constellations related segments of the orbit are to be planned in advance. Given the expected strongly increasing amount of objects, this will not be feasible for the future. For shorter response time in collision avoidance maneuvers, there are directly in orbit control approaches to be implemented in the onboard data processing system in order to determine relative distances to other objects—cooperative and non-cooperative—on-board the satellite to determine and then autonomously realize—optionally in coordination with cooperating objects—a strategy for avoiding collisions. Therefore, exists an urgent need to develop for small satellites, particularly with respect to the increasing density of satellites in LEO formations, capabilities for relative navigation and for collision avoidance strategies.

In addition, there is a need to supply small satellites with a flexible hardware design for use in different problem areas, which have to exhibit a high reliability and operational lifetime.

In addition, the testability of such satellites is to be simplified, in particular in series production, as well as the standardization of the hardware design, in particular the basic equipment of small satellites, to reduce production costs and periods.

Finally, a high fault tolerance and robustness to radiation failures and malfunctions is to be developed, as well as an energy efficient design for increasing functions of the small satellite within the limited energy resources.

The JP H07-89 497 A shows a satellite with a collision avoidance device. By a collision avoidance device a collision with a different object in orbit can be avoided. The collision avoidance system comprises a microwave-based one-dimensional distance sensor for measurement of a scalar distance between satellite and the other object in orbit. In addition, a device is described for collision prediction to determine the potential collision risk and a detour device for controlling the propulsion system. However, no adaptive collision determination is described, as only the direct distance to the object in orbit can be measured, while the direction from the satellite to the object cannot be determined. Therefore, no indication of a flight trajectory of the object can be derived, and thus no energy-efficient detour maneuver strategy can be achieved. Thus by parallel flight trajectories, as considered for satellite swarms, a solely distance based collision avoidance leads to unpredictable motions, significant waste of energy and loss of the complete formation. For the particular case of very small satellites with very limited fuel storage, in addition to the distance also the direction towards the object needs to be known to implement collision avoidance in an energy-efficient way. Also, this document does not outline, how such a collision avoidance device could be implemented in a very small satellite. In particular, how it can be efficiently implemented for small satellites in a swarm, and how the swarm of satellites in mutual dependence can realize a collision avoidance strategy, using purely distance measurements as input.

The EP 3 095 713 describes a carrier board for devices of a satellite, which can include attitude control systems, storage containers and/or radio systems. Each panel is equipped with a main bus including a device for electrical power control and a converter for solar cell power. In addition, so-called ARINC plugs are provided as electrical interface plug-in system of the panels. In this case, at least no separate and specific assignment of individual functions of the satellite to specific boards can be identified, also additional cables are still needed.

In DE 20 2005 015 431 U1 describes a reaction wheel for micro-satellites, consisting of a unit with a magnetic rotor and an inertial mass. In this case, no combination for relative attitude control is described by a combination of magnetic field coils. Furthermore, the necessary sensors for attitude alignment, such as gyroscopes, star or sun sensors are not addressed, therefore it remains unclear how such a reaction wheel for control of relative attitude can be used without interaction with other actuators such as magnetic field coils (for field generation in case of wheel saturation) and propulsion system and sensors for an energy-efficient total control for attitude and direction of motion.

An electric drive system for a microsatellite is displayed in EP 0 903 487 A2. An electrical resistor element is placed adjacent to or within a chamber. When a fluid is introduced into the chamber, the fluid expands because of the thermal energy generated by an electrical resistor element, such that a gas emission propulsion or an arc jet propulsion is implemented. If the pressure in the chamber rises to a certain pressure, the membrane ruptures, causing the fluid to flow out of the chamber, such that the propulsion system may well be employed for a one-time use, but not for repeated attitude control actions. For this micro-propulsion system, pressure is increased by heating and an impulse is generated by the ejected gas, but no details are described regarding the repeated use of the FEEP propulsion.

In DE 10 2010 045 232 A1 a formation composed of several small satellites is addressed, where the relative position and orbit trajectory of each small satellite is adapted by an independent and autonomously operating position control system. Preferably, all the individual satellites are equipped with a position control system. By attitude control systems, each individual satellite can be targeted to an area on the Earth surface and by the position control system the distances to the other satellites are detected and can be adapted. Furthermore, by the position control systems arbitrarily changeable formations are enabled. Nevertheless, here no collision avoidance with an adaptable collision tube is described, and the system is only able to navigate relative to similar satellites, but there is no protection with respect to collision with respect to foreign objects. This publication provides no evidence, how such a position or attitude change could be achieved, as well as the feature of collision avoidance is not addressed.

The presented invention relates to the design of a small satellite capable to fly in a formation, in particular with a mass less than 10 kg, in particular in the range below 2 kg to 1 kg, for LEO applications which satisfy the aforementioned requirement profiles. In particular, be a small satellite capable to fly in formation and a formation of such small satellites are proposed enabling autonomous maneuvers for collision avoidance on basis of relative navigation.

Such a small satellite capable to fly in formation and a formation of such small satellites are subject of the independent claims. Advantageous developments of the invention are the subject of the dependent claims.

DISCLOSURE OF INVENTION

According to the invention, a small satellite capable to fly in formation, in particular a nano- or pico-satellite with a mass of 10 kg or less is proposed for applications in LEO, which comprises an housing and at least one plug-in board arranged in the housing, preferably with a predeterminable functionality and a propulsion system for generating a directed impulse in direction of a trajectory $T_k$. It is suggested, that the small satellite comprises an autonomously and independently working collision avoidance system, which is capable of adapting a trajectory $T_{kk}$ of the flight trajectory $T_k$ by the propulsion system, when a collision with an a foreign object is expected. The flying object can be any type of foreign object, in particular a passive body, in particular space debris, micro-meteorites, asteroids to or other passive objects. The flying body can also be another small satellite capable to fly in formation of the same or a different formation or a single satellite or part of a rocket with an autonomous control. In this case, it may be advantageous if not only the small satellite capable to fly information comprises a collision avoidance system, but also the other active body in orbit comprises by a similar collision avoidance system, and at best a bi-directional data exchange can be established between the small satellite and body in orbit to realize a collision avoidance by a correction of trajectory such that a maximum distance and a smallest possible collision probability can be provided.

In contrast to state-of-the-art, where a constellation of satellites is known, which do collision avoidance via remote control from a ground station, here an autonomous operations system within the small satellite is proposed, which can initiate without contact to a ground station an collision avoidance action to avoid a collision. Since in the LEO applications the small satellites have only for a short time of their orbit visibility ground of the ground station, by a constellation-based anti-collision system can be achieved not a hundred percent collision avoidance. An autonomously operating collision avoidance system within the small satellite is able to perform a correction of trajectory $T_{kk}$ at any position of the orbit autonomously in relation to passive and active bodies in orbit to reduce the probability of collision, and to sustain the lifetime and functionality of the satellite formation. Especially for polar satellite orbits in vicinity of the poles is a relatively high probability for collision of satellites capable to fly in formation, as those approach each other very close in the surroundings of the polar caps. Especially in this areas it is important to avoid a collision with an autonomously operating system, as the density of possible ground stations is there very low.

There are similarities with the collision avoidance situation in road or air traffic, but different sensors and environmental conditions (vacuum, low temperatures, ...) must be regarded in space. The implementation of an evasion strategy is based on completely different dynamics compared to road and air traffic. While road transport is determined by the 2-dimensional Earth surface and the friction of the wheels during motion, and air traffic is substantially governed by the aerodynamics, in space gravitation is the dominant force, which determines the resulting reaction in 3-dimensions with respect to change in position with respect to activities of the propulsion system.

From measured relative distance data between space objects, by suitable orbit models of the satellites a prediction is derived of the future path and of potential collision probabilities with other known objects. For relative distance measurement, optical and radio measurement methods can be used. Also new measurements of objects and their orbit predictions will be included. Consequently, according to the current dynamics an orbit is to be determined, which can be realized without collisions with other objects. The corresponding attitude and position control activities are to be determined and implemented. Objects which can be contacted via communication links use self-organizing procedures by closed control loops from the sensors via the communication link to actuators in order to safely coordinate orbits relative to each other.

According to the invention is the functionality of the traditional harness replaced by a baseplate, in which one or more plug-in boards, which each serve a specific purpose, such that all the power distribution and data transmission links of the satellite are realized in one board and subsystem boards are connected efficiently by appropriate plugging into this baseplate. This has neither by large nor by small satellites been realized this way.

In a favorable implementation, the collision avoidance system can comprise an object detection device with at least one or more optical or radio-based, in particular microwave-based object detection sensors for detecting an relative attitude and velocity of a foreign object in direction of a conical collision tube including the trajectory $T_k$. Further, the collision avoidance system can comprise a collision prediction device for determination of a potential collision risk in the collision tube and of an avoidance device for control of the propulsion system with respect to correction of the trajectory correction $T_{kk}$. Here, it is proposed that the collision avoidance system comprises both a object detection device equipped with optical, radio based, in particular microwave or radar-based object detection sensors, and able to identify both active and passive objects in orbit. Thus the object detection sensor detect objects in orbit in direction of a collision tube having a pre-definable size and possibly a predefined spread of the opening angle and in which other bodies are determined. By means of a collision prediction device, which can determine a trajectory of object in orbit and can detect an intersection with the collision tube, a risk for collision can be determined, and by an avoidance device control commands can be derived for the propulsion system to perform a trajectory correction $T_{kk}$ providing a smallest possible risk for collision at minimum possible energy consumption. Thus, the collision avoidance system is based on the recognition of objects in orbit with both active object detection sensors, as by example an optical sensor, a video camera or electromagnetic sensors, such as micro-wave, IR sensors or radar detection, to identify in particular passive objects. The object detection device may be further coupled to transmitting and receiving sensors, which are in communication with active other objects, particularly other small satellites capable to fly in formation in order to retrieve their current position and their current trajectory. In particular, can such communication link exhibit a limited directed transmitting and receiving domain around the small satellite to communicate only with active foreign bodies in near vicinity. Is a body in orbit recognized with a trajectory oriented towards the direction of the collision tube, a collision prediction device can determine the risk for collision.

This depends on how the trajectory of the body in orbit is oriented in the direction of the collision tube. In case of an intersection of the trajectory of the object in orbit with the collision tube a risk for collision may be derived. In this case, an avoidance device may determine a correction of the trajectory $T_{kk}$ that defines a correction of the trajectory $T_k$ to counter-react to collision with a minimum possible effort on attitude and propulsion energy.

In a further advantageous realization of the above embodiments the object detection device can select a minimum diameter $d_k$ of the collision tube autonomously such that at least the small satellite is included, in particular selected such that at least a multiple of the diameter of the small satellite is included. This ensures that the collision tube includes an environment of the small satellite, so as to guarantee a certain safety distance at encountering foreign bodies and small satellites. Furthermore, the collision prediction device can assign a foreign object tube to foreign object, and select a minimum diameter $d_k$ to the foreign object tube that is at least the foreign object is comprised, in particular selected such that is comprises at least a multiple of the diameter of the object. Thus, it is proposed that there is determined both a collision tube, which comprises the small satellite and is aligned along a flight trajectory of the small satellite, and a tube of the foreign object, determined such that the foreign object, in particular a multiple of the diameter of the foreign object is comprised, which is oriented in the direction of the trajectory of the foreign object. The avoidance device can in case of overlapping of the collision tube with the other body tube in an overlapping area $A_k$, determine a trajectory correction $T_{kk}$ such that in particular multiple trajectory corrections with a cost function are simulated, and from this a minimum cost correction of trajectory $T_{kk}$ determine, and to control the propulsion system to achieve the trajectory correction $T_{kk}$. A minimum cost correction of the trajectory within the context of the invention means that with the lowest possible effort a trajectory correction is performed to reliably provide collision avoidance with the detected foreign object. This implies a low energy consumption for correcting the trajectory with respect to attitude and acceleration impulse, which enables a largest possible distance between the collision tube and the tube around the foreign body. In this example, heuristic methods such as set-valued functions, control engineering approaches, Fuzzy Logic or similar simulation and determination methods can be used to achieve a minimum cost for a trajectory correction.

The space environment is characterized by intense radiation, since the shielding effect of the magnetosphere is missing, which shields the Earth surface against radiation. Typical are Single Event Upsets (SEU) and Latch-ups which affect especially electronic elements. The more compact electronic components are realized, the more sensitive are those for radiation effects. Especially for small satellites, where particularly extreme miniaturization is required, a reliable on-board electronics represents a particular challenge, because traditional approaches are prohibited using radiation-hard components (based on electronic components with particularly thick silicium layers, thus very "old" technology) or shielding by lead plates over the electronic components. In this respect, other approaches are demanded here to ensure the reliable operation of small satellites by integrated software/hardware solutions.

For this reason a further embodiment, the plug-in board includes a variety of functional cores for provision of a predeterminable functionality in particular an even number of at least two or more comparable functional cores for redundant provision of the functionality, wherein a watch-dog device monitors a correct operation of the functional cores, and wherein preferably the watch-dog device monitors the functionality of a functional core by a test function sequence and the watch-dog device selects upon fault detection, a fault correction activity of one or a group of functional cores for continuous, uninterrupted provision of functionality.

Thus, it is proposed that the plug-in plate or at least one plug-in board of the small satellite comprises an even number of functional cores, in particular two, four or six functional cores, each function core is capable to execute the basic function of the plug-in board. Generally the functional cores work autonomously and in parallel to each other. A watch-dog device monitors continuously and/or periodically the functionality of each functional core and compares inputs and outputs as well as a correct operation of each functional core. The watch-dog device simulates a test function sequence, in which the functionality of each functional core can be tested by means of known output parameters for given input parameters. When by the monitoring or by a test function sequence results that one of the functional cores not working correctly, this function is switched off and failure recovery actions are initiated. These can be a reset or a deactivation of the functional core. Also, it can be made a re-programming or transfer of a memory content of an operational function core to a memory content of an obviously erroneous function core. Thus a running program can be overwritten during a fault correction action. Also, the plug-in board or a function core can be restarted, with errors adjusted which can occur both in the memory content, as well as in processing. The watch-dog device can monitor, for example, a periodic signal of the function core, or can check concrete results of a test function procedure. Also conceivable is the combination of different monitoring approaches. It may monitor, both the CPU and the RAM of each function core, for example by checksum forming or reading in and out of predetermined bit patterns and areas of the memory by means of a Software-implemented-Fault-Injection algorithm (SWIFI). In particular, bit error rates can be reduced this way.

The watch-dog device can be hardware as well as software implemented and performs cascaded monitoring functions. In this case, in hot redundancy e.g. during continuing operations, a continuous monitoring is done on the proper functioning of the functional cores. The functional cores can work in a master-slave operation, in which the sequence of master and slave can be interchanged in case of error. Thus a local master program can work parallel to a Second Region Local Replication as slave and a checksum may be supervised by coherence analysis. Are here differences or errors discovered, a fault recovery step can be initiated, especially of the master function core.

In extension of the previous realization, the watch-dog device can implement a FDIR algorithm (fault detection, identification and recovery techniques), and particularly activate a power reset, a switching between functional cores and or a software reset, where this is especially energy-efficiently implemented for two function cores in hot redundancy, and wherein at least one function core can be reset by soft- or hardware. An FDIR algorithm corresponds to a self-healing algorithm in which a software is able to autonomously detect defects (fault detection, watch-dog), determine the fault (fault isolation, eg. switch-off or reset of defective components) and perform appropriate corrections (recovery, for example switching to a second function core or reboot the system). For example, incorrect bits can be detected by a checksum generation and can possibly be corrected. With increasing defect density, defect memory locations can be identified and corrected are or can be blocked, or switched to a different functional core or reset. It is possible, not in the context of majority voting, but in the context of a minimal number of redundant function cores, particularly two to achieve an increased fault robustness to enable radiation hard performance even without conventionally employed shielding and lead plates. This way a durability of the technical function of the small satellites is achieved, largely neglecting a radiation hard implementation of the small satellite, and only assuring by software technology the function and reliability of the small satellite.

Thus, it is proposed to use energy efficient, highly miniaturized components in hot redundancy, which are monitored by software on an "intelligent" watch-dog. Advanced FDIR Software (Fault Detection, Identification and Recovery) enables after occurrence of radiation effects by fast detection of defects, followed by the initiation of rapid switching processes to error-free running components and subsequently immediately initiated re-boot processes of faulty components such rapid internal response, such that an outside observer does not perceive any change in the functioning of this electronic component. This realization is particularly suitable for high reliability dependent electronic components is of particular importance in the areas of on-board data processing and attitude/orbit control and thus represents an essential basis for cooperating, distributed, autonomously reacting satellites, by example for formation flight.

In an advantageous further development of the small satellite, the propulsion system can comprise at least one reaction wheel and at least two magnetic field coils, preferably one reaction wheel and at least three, particularly six magnetic field coils of a magnetorquer device for the combined attitude control in any direction. The reaction wheel can be miniaturized and by example be arranged on a plug-in board. The at least two, particularly at least four, and preferably six magnetic field coils can be arranged on the backside of housing surfaces of the small satellite. Using the reaction wheel a mechanical impulse along at least one axis for attitude alignment is provided in an axis direction. Magnetic field coils of a magnetorquer device can achieve an alignment of the small satellite along the Earth's magnetic field, wherein the magnetic field coils, which are powered align themselves in the direction of the earth's magnetic field and thus enable a rotation of attitude. With at least one reaction wheel and two magnetic field coils of 90° rotated axes basically an attitude control can be achieved with a minimum number of components and a very low energy consumption for the attitude control. Since six housing panels form the sides of cubic shaped small satellites, it is advantageously possible, with respect to identical structure of the housing walls, to accommodate on each housing backside a magnetic field coil such that six magnetic coils, with two magnetic coils aligned in pairs in each axis direction, and at least one reaction wheel are provided to achieve an attitude control with fast reaction and minimum energy consumption for the small satellite.

In a further development of the aforementioned realization of the propulsion system can be at least two out of a group of at least one star sensor, at least one sun sensor, at least one gyroscope, preferably a MEMS gyroscope, and/or at least one magnetometer, particularly at least a 3D-magnetometer, a 3D-gyroscope, six biaxial sun n sensors and six biaxial star sensors on a plug-in board and/or on one or more housing walls, in particular arranged on each housing wall, further preferably the reaction wheel is arranged as a miniature reaction wheel for the attitude control correction on a plug-in board or on the motherboard. The general construction of a reaction wheel is basically known wherein specifically for use in small satellites it is proposed to use a particularly energy-efficient realization with an energy consumption of 150 mW or less at a particularly high rotational speeds of 19,000 U/min or more. For an attitude control in the propulsion system, it is necessary to determine the relative attitude, eg. the attitude of the small satellite with respect to the other satellites of the formation and with respect to the Earth's surface. For this purpose, a group of at least two sensors can be used, selected out of a star sensor, a Sun sensor, a gyroscope or a magnetometer. A Sun sensor is capable to determine the direction of the Sun with respect to a surface of the small satellite. Since the Sun is only visible in sections along the orbit of the small satellite, in addition a star sensor can be included that can determine the attitude relative to a stellar constellation or a fixed star. A gyroscope enables in space attitude determination by means of a gyroscopic principle and a magnetometer can determine the attitude with respect to the Earth's magnetic field. By combination of the individual sensors, especially when arranged at a housing wall can accommodate by identical implementation of all six housing panels of a cubic satellite on each housing wall at least one sun sensor, at least one gyroscope and a 3D-magnetometer as well as a 3D-gyroscope by example in form of a MEMS-gyroscope (micro-electro-mechanical system). Such MEMS-gyroscopes may use integrated circuits, particularly three-dimensional and comprise oscillatory components, which can recognize acceleration and changes of direction. The magnetometer can be implemented as magnetoresistive semiconductor, especially as a 3D magnetic field compass. Preference is given to place individual sensors on housing rear walls or housing front sides of the small satellite and allow energy-efficient and simple attitude control of the propulsion system.

In a preferred further development of the small satellite, the propulsion system comprises at least one electric propulsion, in particular at least one FEEP thruster (field emission electric propulsion) or an electric arc jet (micro arc thruster), in particular four electric thrusters, which are preferably realized as FEEP thrusters, further preferably arranged in the edge area or corner area of the preferred cubic housing preferably in or on a housing frame. The housing frame comprises as structural elements four individual edges, consisting of a light metal such as Aluminum exist and define the support structure for the housing surfaces of the small satellite. In this edge element a FEEP thruster can be integrated, which can generate in one direction a propulsive power. A FEEP thruster is a special form of an electro-thermic propulsion, wherein electric power is used to heat working gas to high temperatures and to split it into charged particles (ions and electrons). Here, a magnetic field is spanned between a cathode and an anode to field of eject at high velocity the charged fuel particles. Due to conservation of momentum, the satellite moves in the opposite direction of the ejected fuel. The required power for the set up of the magnetic field can by example be generated by solar cells, which are arranged on the surface of housing walls of the small satellite. The thrust generated is relatively low and is in the range of milli-Newton, but due to the low mass of a small satellite of less than 2 kg, preferably below 1 kg a low thrust energy is enough to generate an attitude correction or a trajectory correction, in particular to avoid a relative collision and to maintain a trajectory. Only very little fuel is needed and the operating time of the FEEP thruster is very long. Therefore a superlinear propulsion effect arises, although the low performance propulsion due to the in relation even more reduced total mass compared to a conventional propulsion concept of existing small satellite designs, although a thruster is used with a relatively low thrust force, but by the very low mass of the small satellite a surprisingly high thrust/mass ratio can be achieved. In contrast to the state-of-the-art, in which—in most cases for a single use the pressure is increased by heating and the ejected gas generates a thrust—the novel approach is that acceleration of electrically charged particles in a applied magnetic field is used, this is exactly controllable, multi-repeatable and can be used at low impulse performance. Preferably, as a development of the aforementioned embodiment, the edge area of the housing frame can comprise a hollow profile or a profile with a porous inner structure, in which the fuel, in particular gallium. ammoniac or hydrazine is stored for electric propulsion. Preferably, the fuel is stored frozen during the launch process and can be liquefied when reaching a target orbit. Thus it is suggested that four corner sections of the housing frame each host a FEEP thruster at their end section, wherein the edge portion of the housing frame is designed as a hollow profile in which is stored fuel in a launch or initialization phase, in particular at room temperature solid gallium, ammoniac or hydrazin for the electric thruster. Thus, it is proposed that four corner profiles of the housing frame each have an electric thruster at their end section, wherein the edge portion of the housing frame is designed as a hollow profile in which in the launch or initialization phase fuel is stored. Instead of the hollow profile also be a porous inner structure of the structural element can foreseen, for example as a metallic sponge structure with a high stiffness at a high hollow space density for the fuel storage. The fact that frozen fuel fills the hollow profile or the sponge structure, such that it will reach a high mechanical stability, in particular in a launch phase of the small satellite. Is the satellite in its orbital position, the fuel can be liquefied and serves for generating the thrust performance. By this realization no separate fuel tank is required, but the fuel is constructively integrated into the mechanically stable parts of the housing frame and it serves as a mechanical stability structure in the launch phase.

In an advantageous further development, in the housing a housing frame can comprise a variety of housing walls, in particular six housing walls and a baseplate board with at least two plug-in sockets, wherein the plug-in board is inserted into the baseplate board and the plug-in board is in communication via a data bus and power bus which supports at least one e specially multiple communication protocol standards like UART (Universal Asynchronous receiver transmitter), SPI (Serial Peripheral interface), CAN (controller Area Network), Space Wire and/or I²C (Inter-Integrated Circuit), in particular a serial information bus to connect with further plug-in boards and/or the propulsion system and/or at least one sensor and/or an actuator device and a power supply device. In this way, no additional wiring as it is still state-of-the-art is required, and all energy supply and data transmission lines of the satellite are realized in the baseplate. This approach of a baseplate is essential with respect to the use of micro-satellites with a mass <10 kg.

In this embodiment, a modular construction of the electrical system of the small satellite is proposed. The central component is a baseplate board, which comprises at least two, particularly a variety of sockets, in which individual plug-in boards can be inserted. The plug-in boards communicate with each other via a data and power bus, that takes into account at least one or more communication standard protocols. In addition, a SpaceWire standard communication protocols may also be supported. A SpaceWire bus is a field bus, specified by ESA, able to transport serial and full duplex data at high speed. It exhibits a high robustness and low power consumption, and particularly a high EMC-tolerance and is adapted to space requirements. This makes it possible for multiple plug-in boards to get in contact to each other in a standardized plug-in system via a motherboard and to exchange data between individual baseplates board, as well as to the power supply and external data to the propulsion system and to the sensor system of the small satellite. Preferably at least parts of the propulsion system and of the sensor system, in particular essential system components thereof, are arranged in the housing walls or in the housing frame. Each of the plug-in boards can accommodate different tasks, which comprises in particular a communication (COMM), a central data processing system (OBDH), a propulsion control system (ADCS), and an energy supply system (EPS). Furthermore, plug-in systems with one or more plug-in boards (SENS) may be used for the various scientific and technical tasks of the small satellite, for example a radar surveillance, a visual monitoring of the Earth's surface, a provision of communication services or similar services. Thus, the small satellites in a minimal configuration are fully capable for orbiting and for control, and dispose particularly an autonomously operating collision avoidance system. By plug-in of further function boards special functions of the satellite can be provided for different applications fields.

In a further development of the aforementioned embodiment, the baseplate board can comprise a multi-stage and scalable power supply device, providing the energy in at least one photovoltaic cell and/or at least one accumulator as a energy source, wherein a variety of voltage converters, charge controllers, and energy monitoring and power switches are included to detect, distribute and control both an energy output of the energy source and energy consumption of energy sinks, in particular of plug-in boards or propulsion systems.

In this embodiment, an electric power system of a small satellite, in particular a pico-satellite, is proposed according to the invention in which a power generation is provided, for example on the basis of solar cells, arranged on the outer sides of the housing walls, and additionally inside an energy storage is arranged, for example as rechargeable accumulator or as a fuel cell or the like. The energy storage can be charged by the solar cells. Both the solar cells and the energy storage can provide power to the electrical system of the small satellite, wherein different cascaded voltage levels can be provided, which can be separately switched-off in case of failure. This provides a redundant energy generation, storage, conversion and distribution. Here several DC/DC converter for providing operating voltage from the can photovoltaic cells may be provided. Several charge controllers for charging and for energy output from can be foreseen for the rechargeable energy storage. The energy storage devices may provide the voltage at different voltage levels, with additional DC/DC converters providing different voltage levels. The DC/DC converters can include efficient, energy-saving boost and buck converters. Also, from a voltage level by further DC/DC converter can be derived higher or lower voltage levels.

Such an EPS (Electric Power System) enables the supply of the individual subsystems of the small satellite in a variety of ways. Thus, on each housing wall surface a photovoltaic cell can be arranged, such that six individually working photovoltaic cells are connected to each other for generating regenerative energy. On a plug-in board one, two or more accumulators can be arranged as energy storage to store or to provide energy. The photovoltaic cell on each housing wall may be divided into two, and may include a space between to accommodate by example attitude sensors. On the back of the housing wall, a magnetic field coil can be placed as a magnetorquer or as a magnetometer. The magnetometer may be realized power efficiently as an integrated electromagnetic semiconductor. Using DC/DC-converters, the higher voltage of the photovoltaic cells can be reduced to a low voltage for charging a battery or an accumulator. By example, lithium-ion batteries can be used with several ampere-hour capacities. Here voltages of about 3.4V to 3.9V can be provided and increased to 5V by DC/DC converters. In this case, a 3.3 V bus and a 5 V voltage bus can be provided. The distribution of energy can be provided by means of circuit switches or current fuses. Over-voltage and over-current protection mechanisms can be foreseen. In this way, it is possible to provide a redundant power system with high reliability for the small satellite.

According to a further embodiment of the above-mentioned variants of the small satellite the baseplate board can be planar, and comprise an I/O board with at least one analog and/or one digital interface socket, which can be inserted into a plug-in side of the baseplate board with a variety of plug-in sockets. Here the plug-in side may comprise the data and power bus, and at the side of the baseplate board comprises a socket for electric connection with a housing wall. Thus, the baseplate board of the small satellite is specified such that it serves planar as a basis for the plug-in boards and comprises a variety of sockets. A single I/O-board is used to external contacts to the electrical system of the small satellite, and includes an analog and/or digital interface connector. On the baseplate board, the data and power bus is provided, which connects the individual sockets to each other. Sideways, eg. in the planar plane of the baseplate board, there are foreseen at least one, preferably on the different sides of the base board two, three or four connectors to housing walls to connect to the adjacent to housing walls, which host photovoltaic cells, the magnetic field coils, and the sun or star sensors, as well as optical sensors, and which may be coupled via the power and data bus with the plug-in boards. By this approach a plug-in system is enabled, which prepares the small satellite for a variety of tasks. The housing walls may provide mutual contacts, for example by a flat cable connector, such that a single connector to the housing frame is sufficient for contacting all housing walls.

In a further development of the aforementioned embodiment, the plug-in board can comprise at least one communication board (COMM), a data processing board (OBDH), a power supply board (EPS) and/or an attitude control board (ADCS). A housing wall comprises at least one photovoltaic cell and/or at least one magnetic field coil and/or at least one optical sensor and/or an antenna, such that the housing frame, comprises at least parts of the propulsion system, in particular at least one FEEP propulsion.

This embodiment defines a minimum number of plug-in boards, that at least includes one communication board, COMM—Communication, one data processing board, OBDH—On-board data handling, one energy supply board, EPS—Electrical Power System and/or one attitude control board—ADCS Attitude Determination and Control System. A least the OBDH, the on-board data processing system is designed in dual-redundancy and the Electrical Power System EPS is redundant and scalable to distribute the electrical energy to the individual subsystems of the small satellite. The COMM plug-in board is a completely redundant UHF communication subsystem for communicating with adjacent small satellites, but also for communication with a ground station, especially for receiving control data and for sending sensor data. The ADCS serves to control attitude and propulsion of the small satellite and includes, for example, a collision avoidance system.

In a further independent aspect, a formation composed of several small satellites is proposed, where relative position and flight trajectory $T_k$ of each small satellite can be adapted by an independently and autonomously working collision avoidance system. This makes it possible to control a locally focused formation of small satellites, which is designed to detect with high resolution a locally limited region of the Earth's surface, or a formation of distributed small satellites on different orbits, intersecting for example in the vicinity of the pole region, such that no collision between the small satellites can occur. The collision avoidance system, can use a bi-directional communication between the small satellites to achieve a collision avoidance and to maintain the formation, and can be able to detect passive other bodies, such as space debris, asteroids, meteorites or other spacecraft, which do not support bidirectional communication. This makes it possible to operate a formation of small satellites in a LEO orbits with long lifetime, and low risk of failure.

In an advantageous development of the formation, a trajectory correction $T_{kk}$ of a formation trajectory $T_S$ or a correction of formation trajectory correction $T_{Sk}$ of the other small satellites in formation for maintaining or realignment of the formation trajectory $T_S$ may be executed, if a predetermined deviation of the trajectory $T_k$ of the small satellite is exceeded, wherein preferably the small satellites are in bidirectional exchange of their relative position/attitude and/or their trajectory $T_k$. In this further development it is proposed, that a correction in feedback to a formation trajectory $T_S$ can be performed, when a trajectory correction $T_{kk}$ is initiated in case of a substantial deviation of a initial flight trajectory $T_k$ by a collision avoidance strategy, or where appropriate the formation trajectory $T_S$ is changed for all small satellites of the formation in such a way, so that the formation may be maintained and a collision avoidance for the whole formation can thereby be provided. It is useful and advantageous, if the small satellites are in bidirectional exchange and communicate their relative position and their trajectory $T_k$ or their trajectory correction $T_{kk}$, such that it can be decided whether the formation trajectory $T_S$ can be changed, or if a single trajectory correction $T_{kk}$ brings the evasive satellite back into the formation at its earlier position, such that the formation can be maintained.

DRAWINGS

Further advantages emerge from the presented description of the drawing. In the drawings examples of embodiment of the invention are displayed. The drawing, the description and the claims contain numerous characteristics in combination. The expert will consider the features expediently also individually and will group them to meaningful further combinations.

Figure 1B:
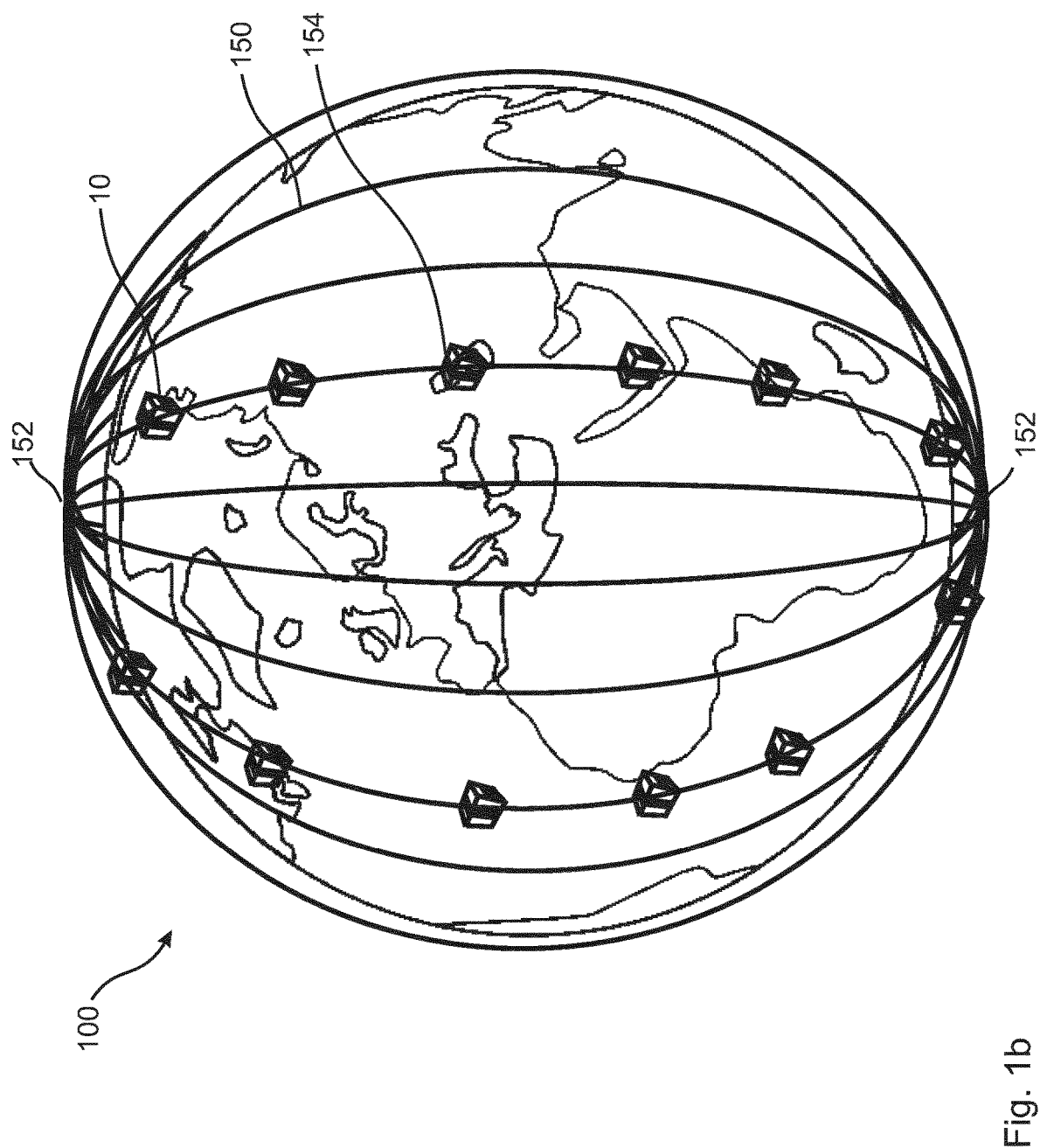
Figure 2:
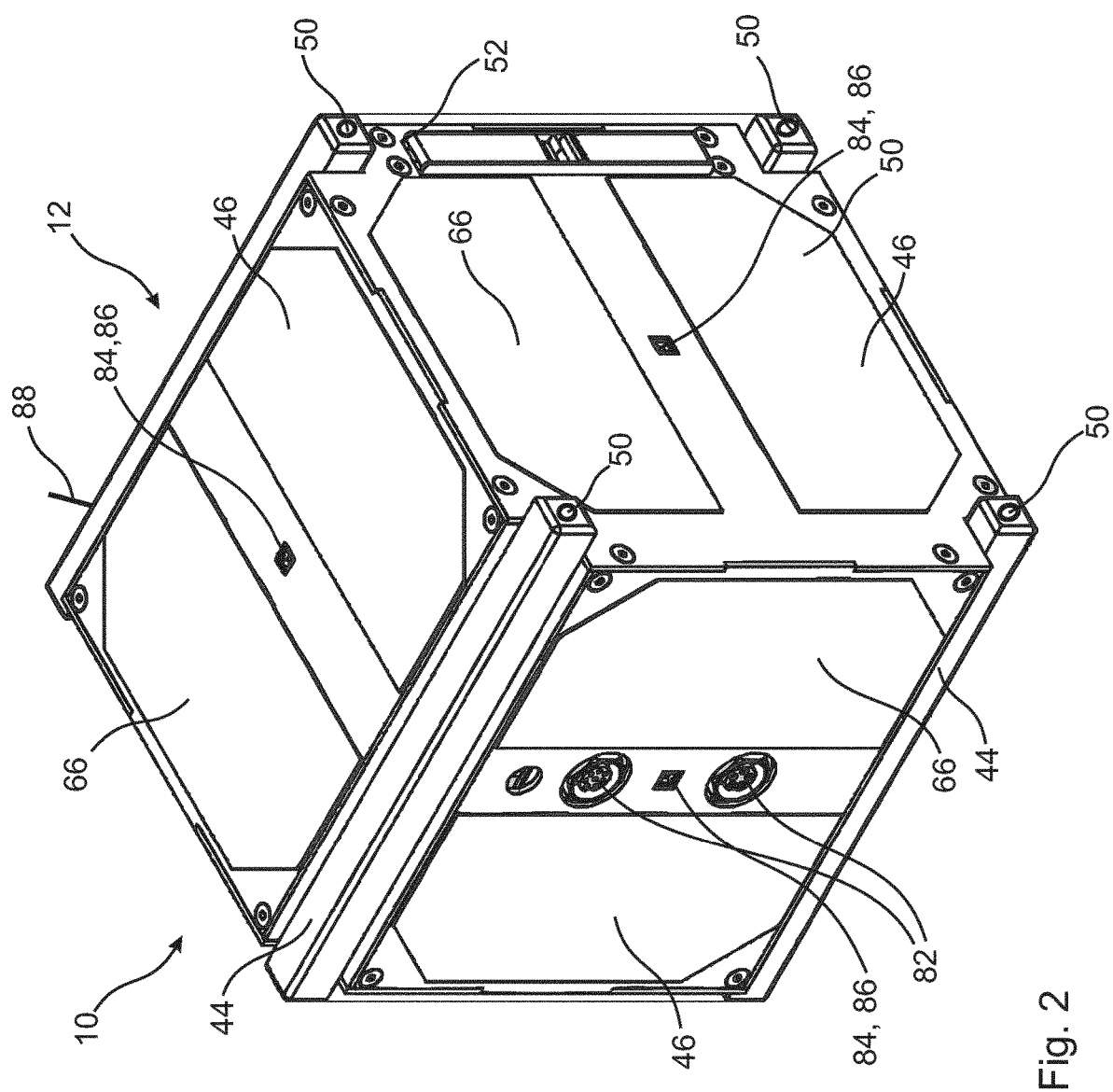
Figure 3:
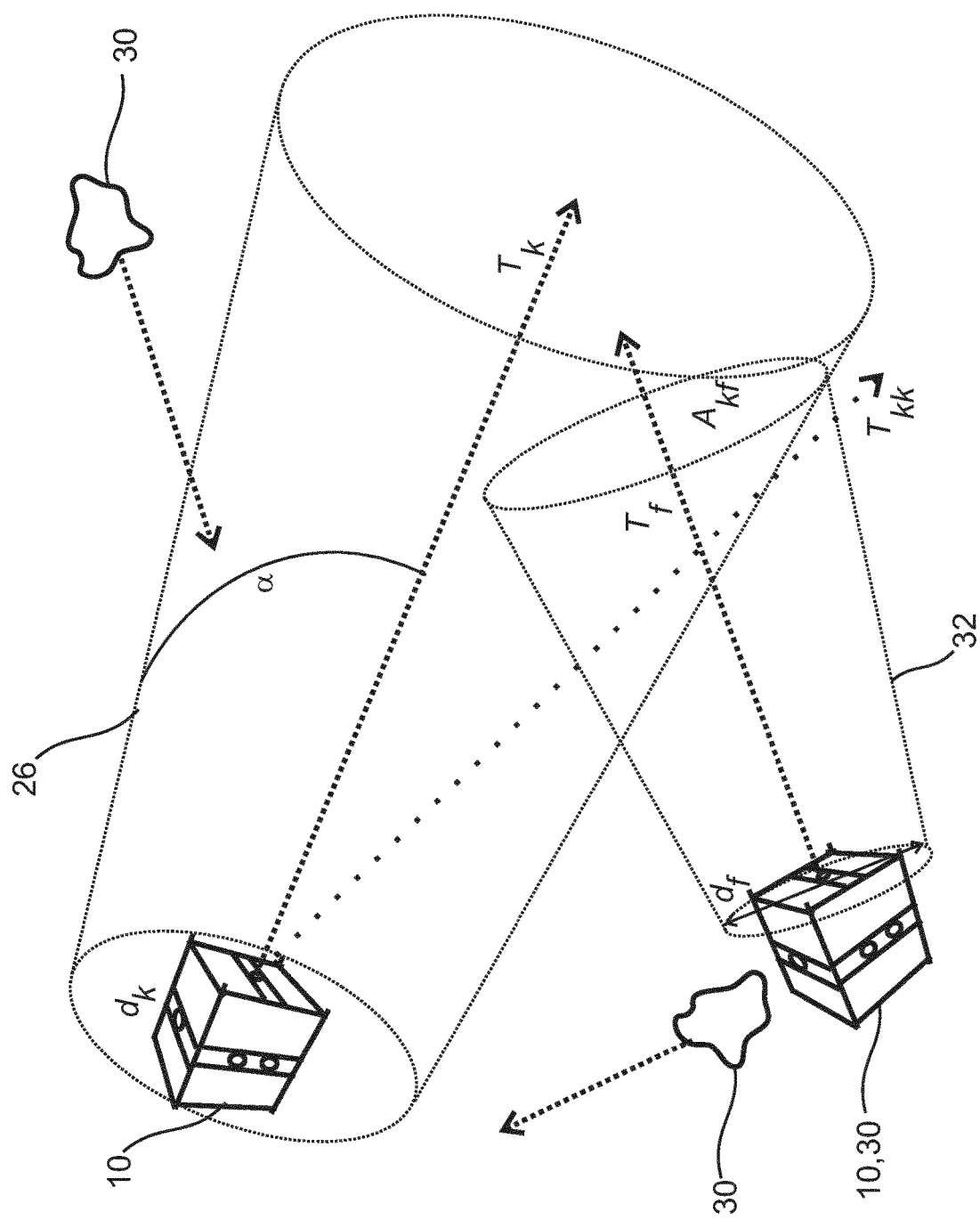
Figure 4:
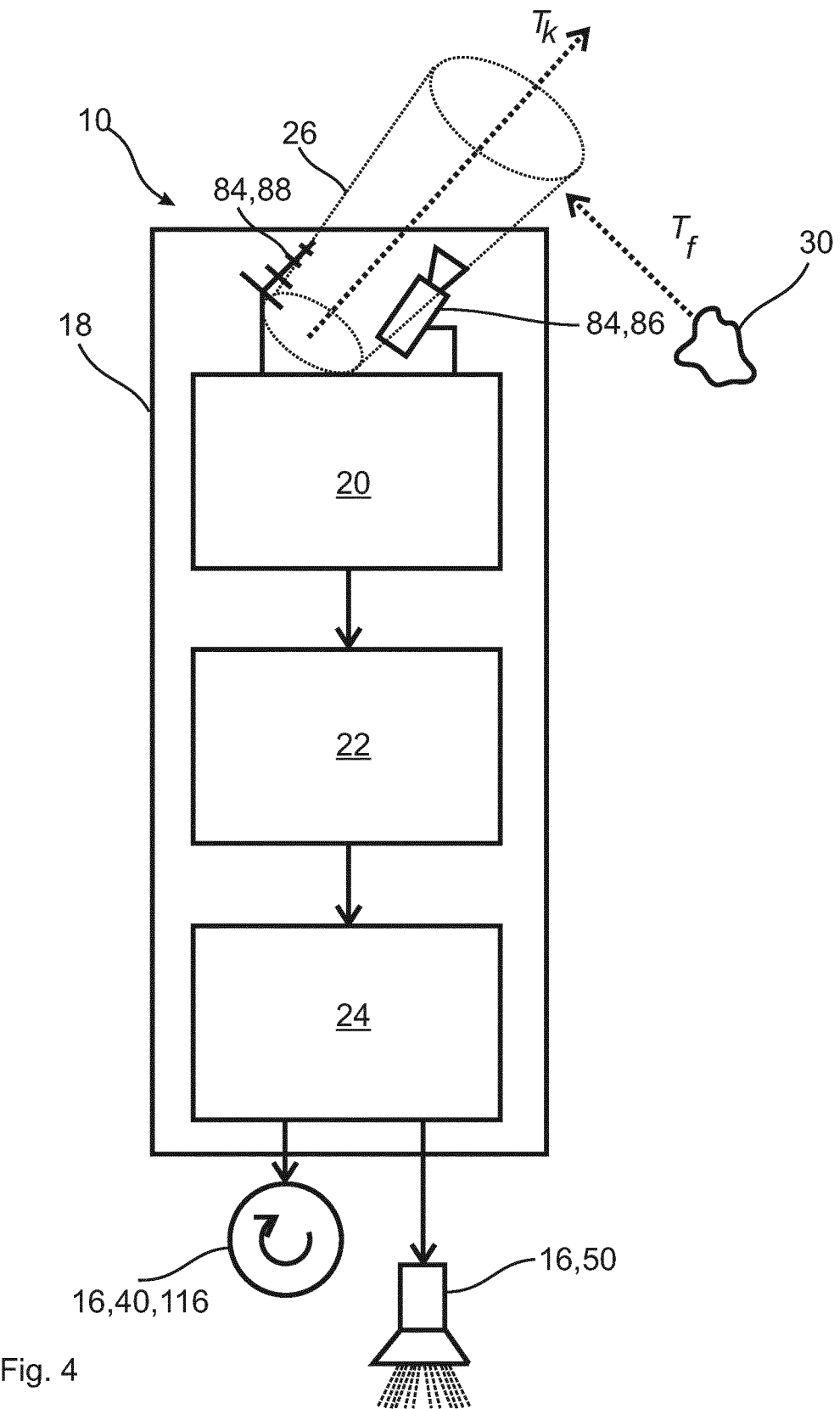
Figure 5:
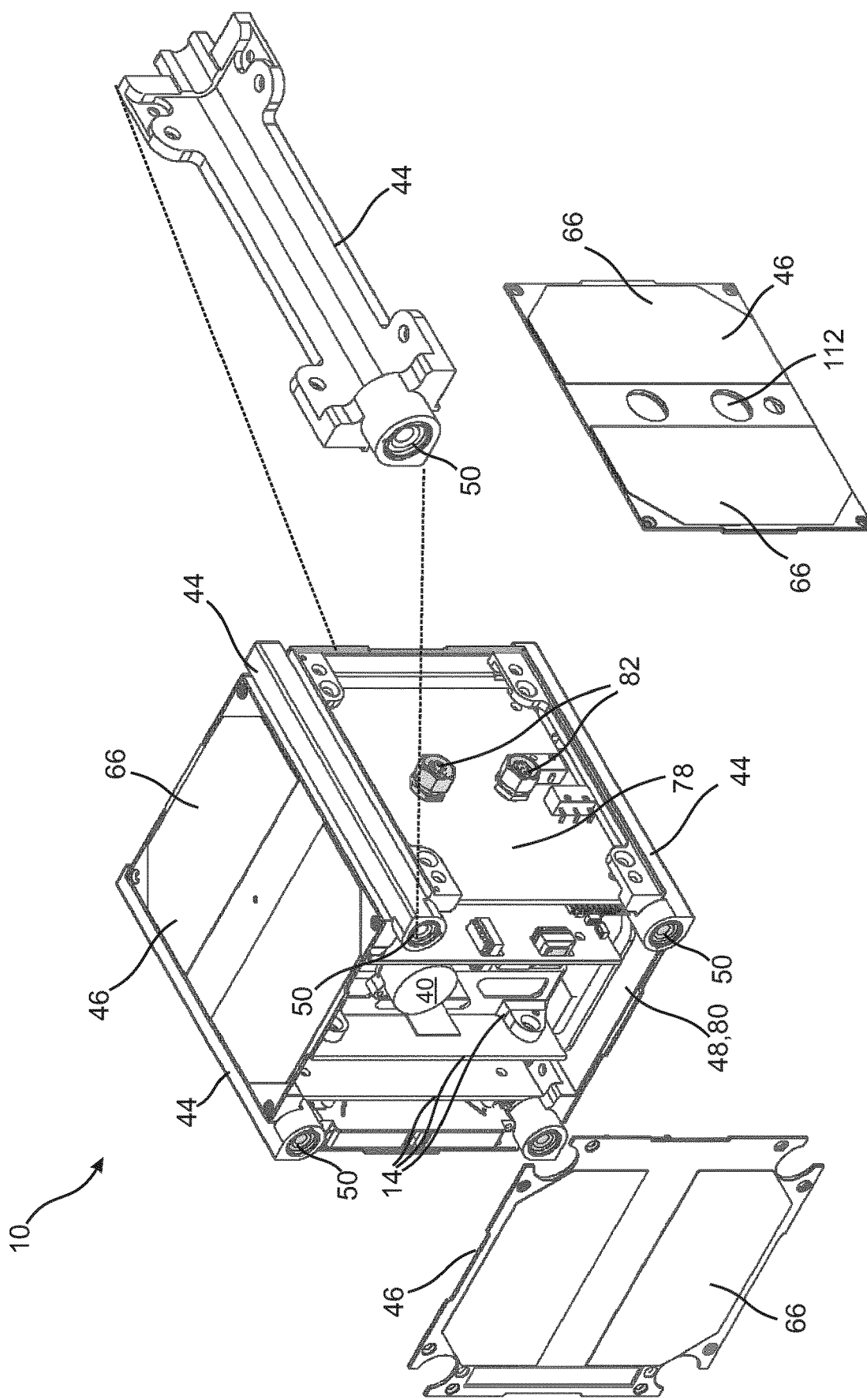
Figure 7:
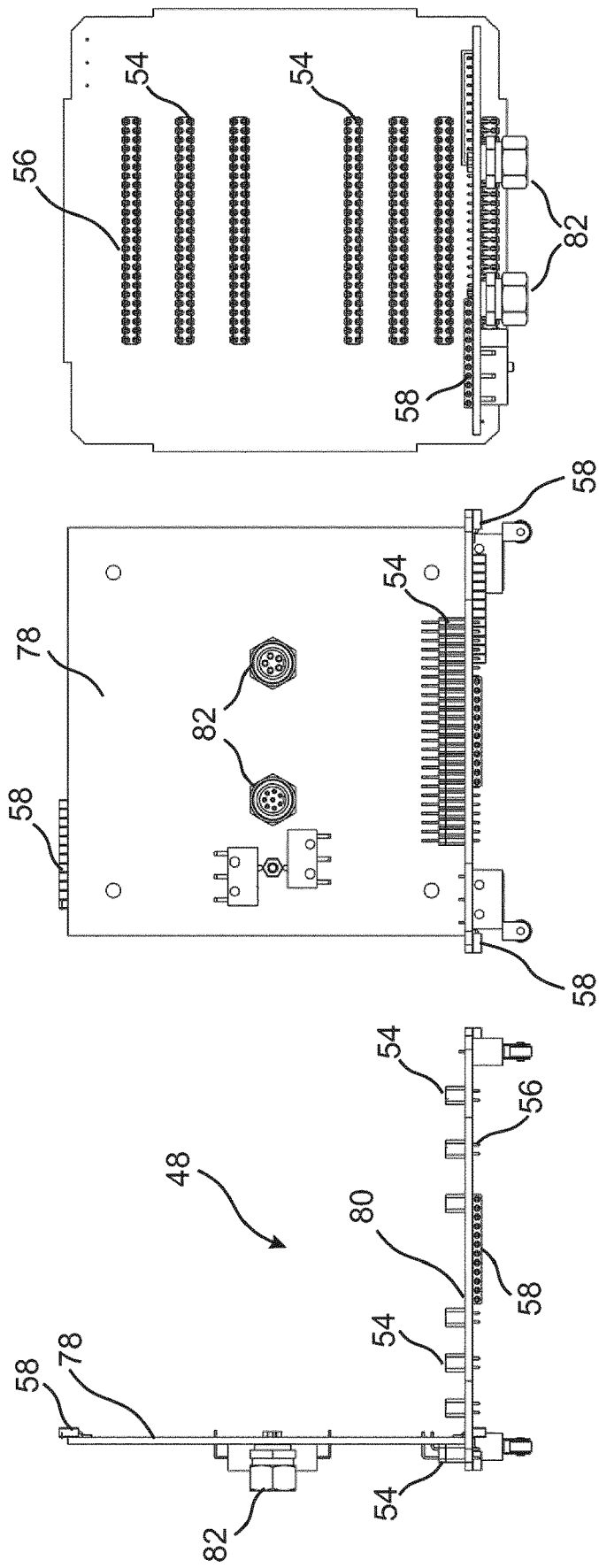
Figure 8:
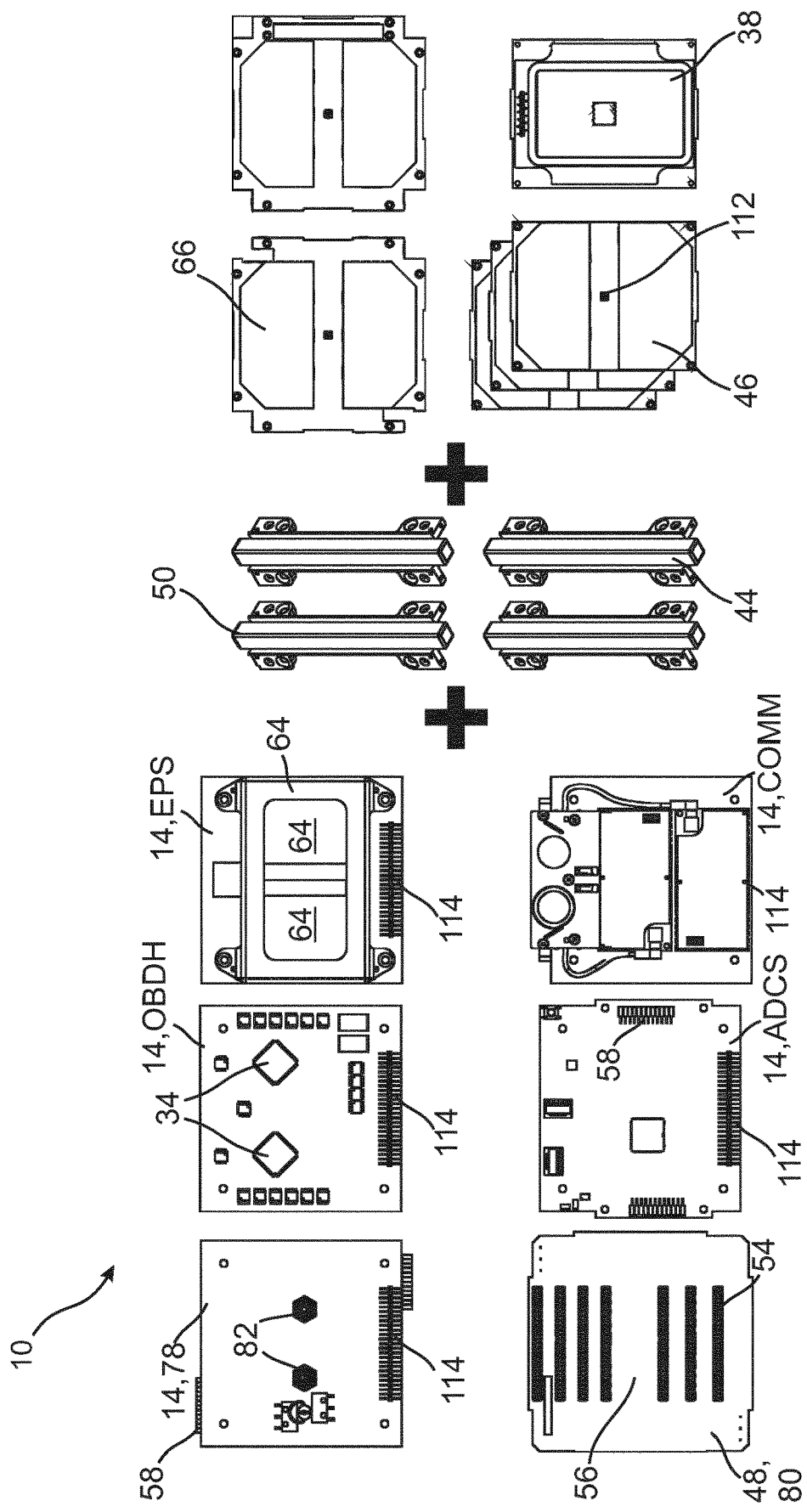
Figure 10A:
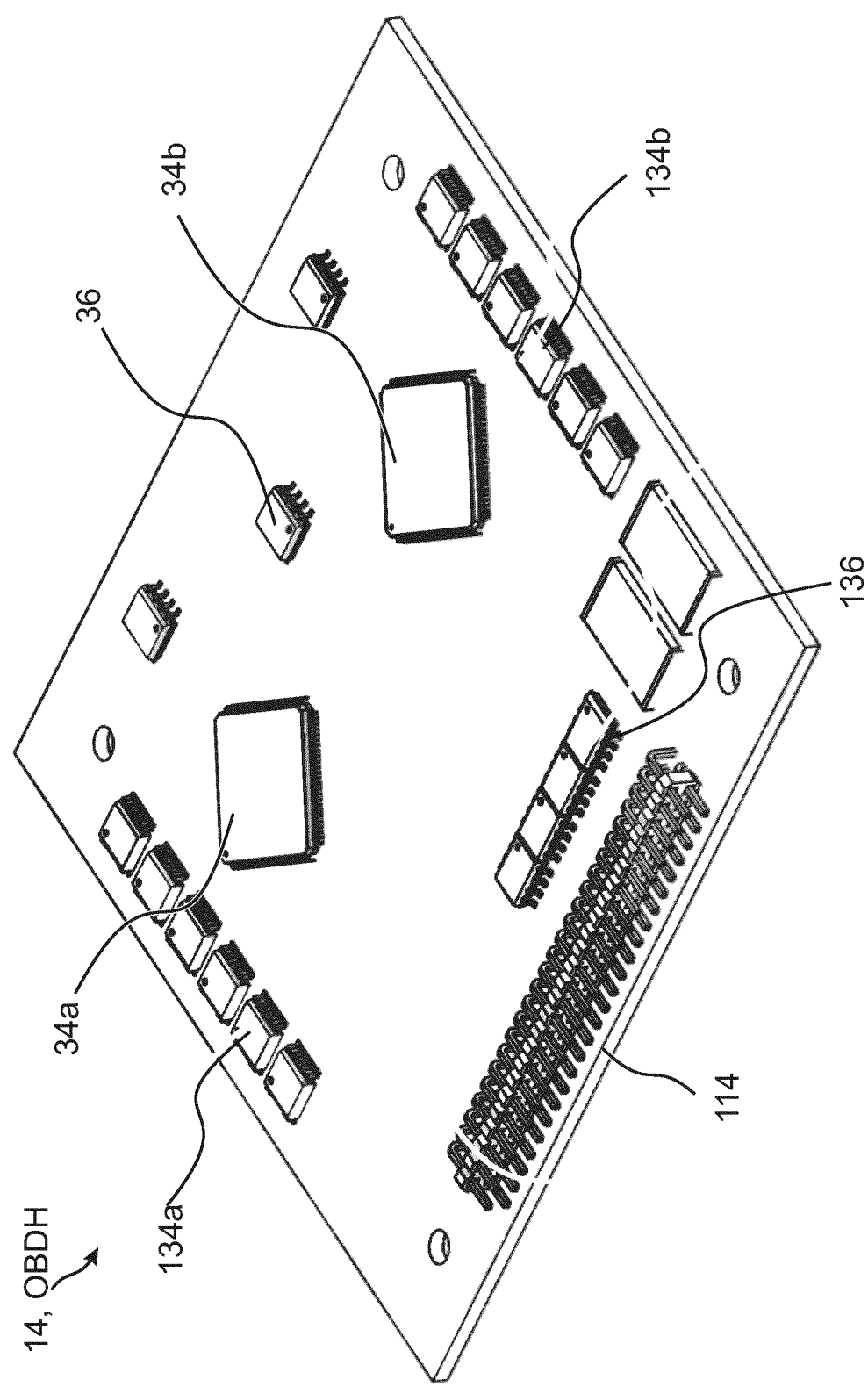
Figure 10B:
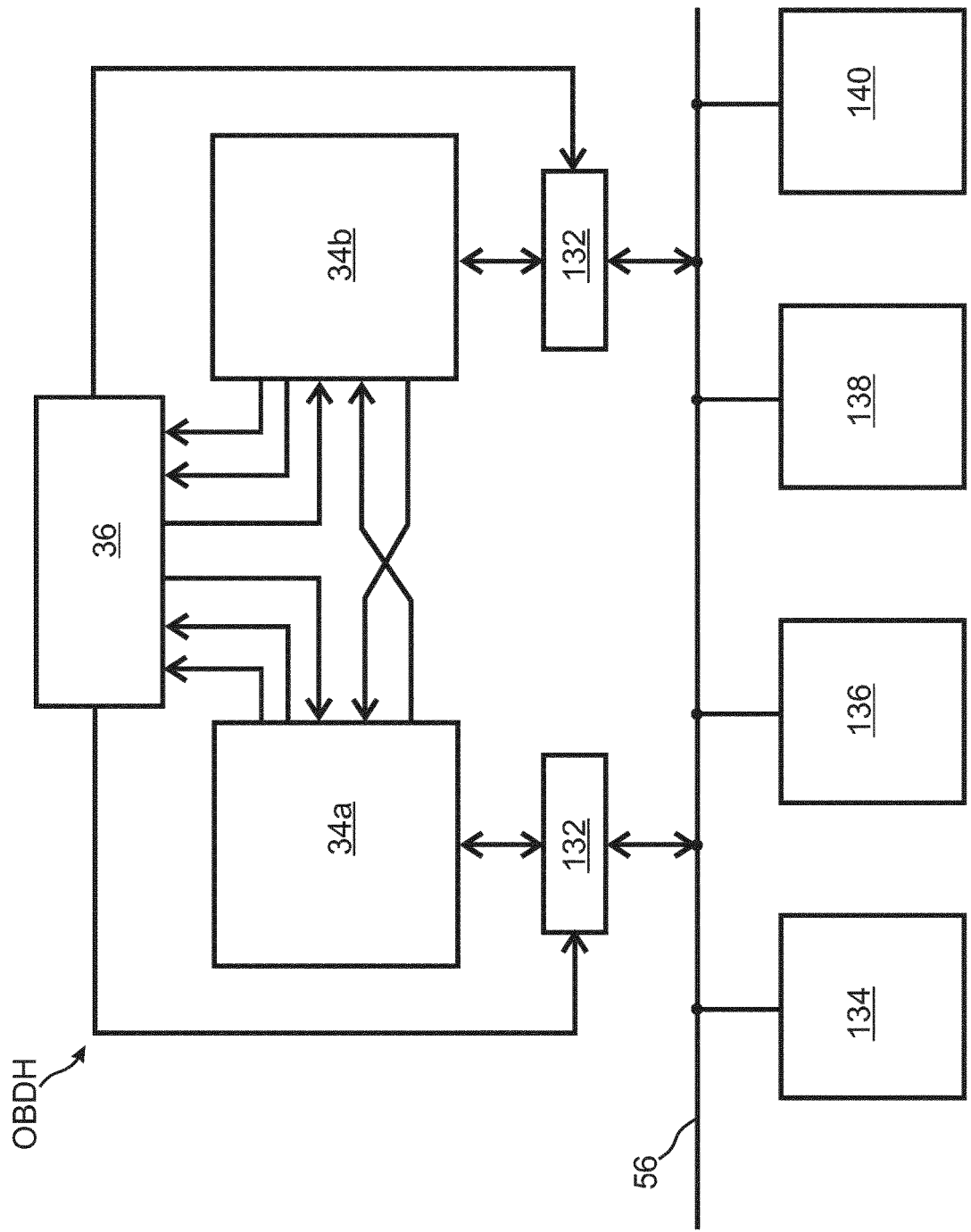
Figure 11:
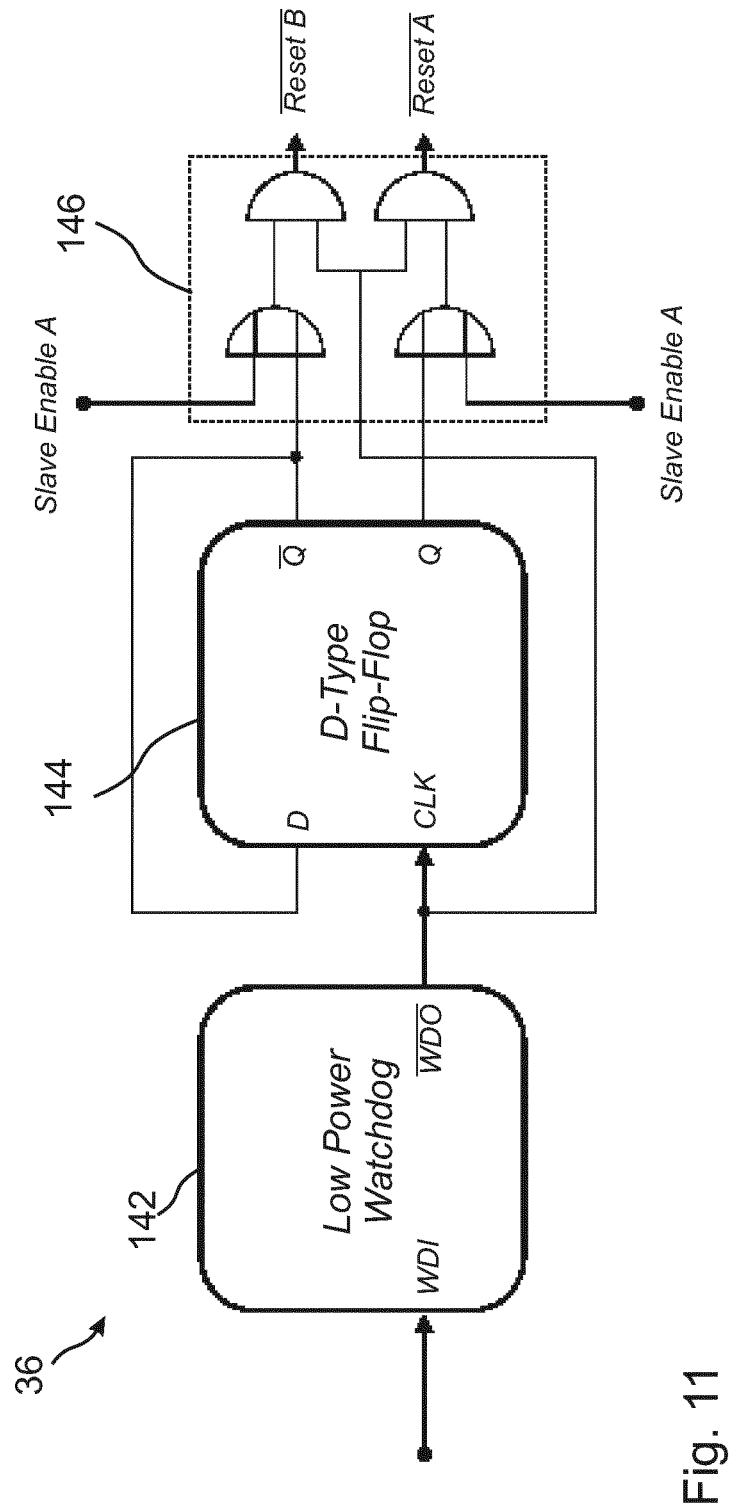
Figure 12:
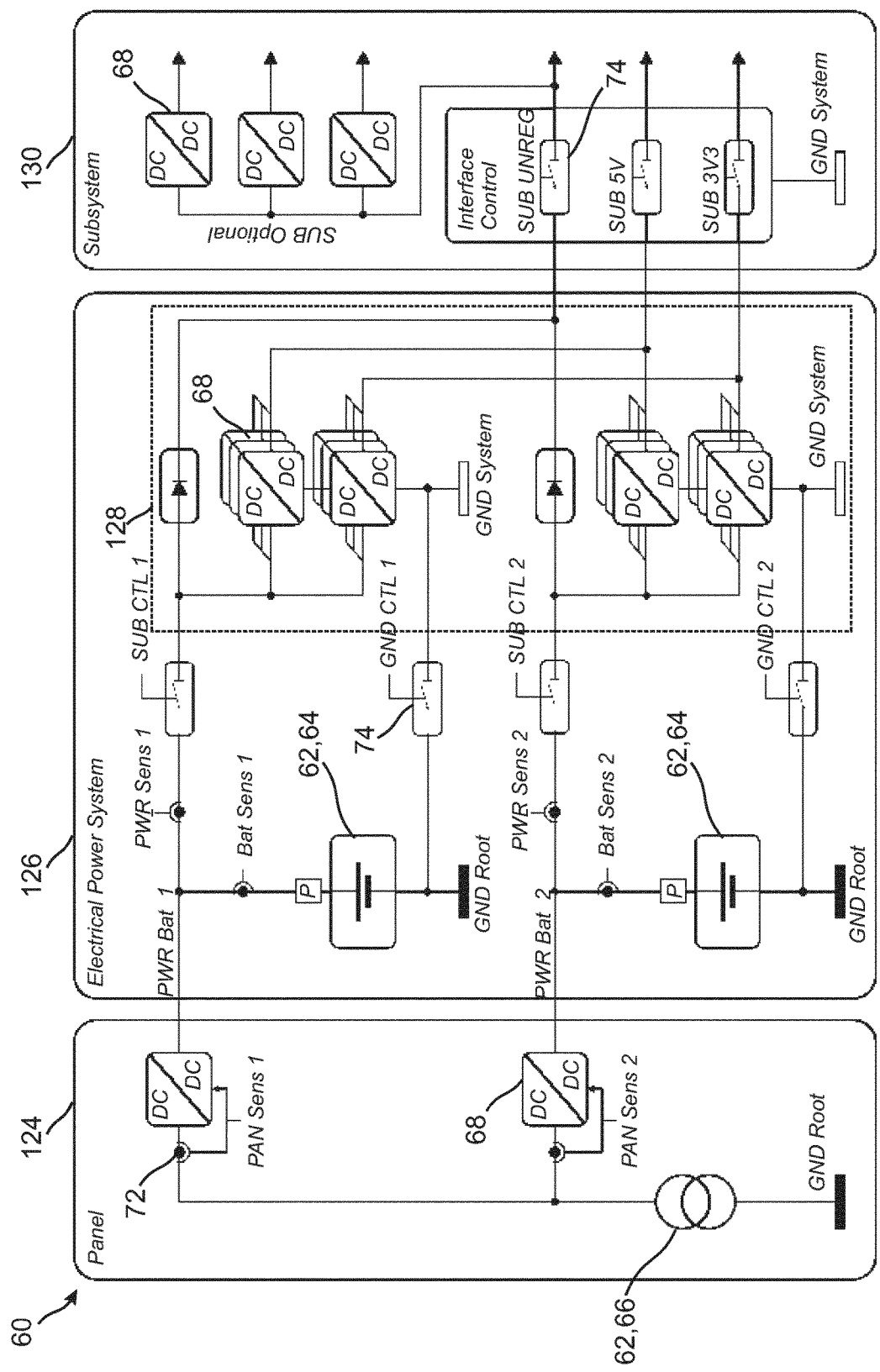

Displayed are:

FIG. 1 in a sketch-like picture a first representation of a formation of small satellites according to the invention, FIG. 2 in a further perspective view of a further representation of a formation of small satellites in accordance with the invention FIG. 3 a schematic picture of a collision avoidance system in representation of a small satellites according to the invention, FIG. 4 schematic view of a block diagram of a collision avoidance system in embodiment of a small satellite according to the invention, FIG. 5 an exploded view of an embodiment of a small satellite according to the invention, FIG. 6 a detailed view of constituent expansion stages of an embodiment of a small satellite according to the invention, FIG. 7 the baseplate board of an embodiment of the small satellite according to the invention, FIG. 8 individual plug-in boards and housing components of an embodiment of the small satellite according to the invention, FIG. 9 picture of plug-in boards for various functions of an embodiment of a small satellite according to the invention, FIG. 10 an on-board data processing system of an embodiment of a small satellite according to the invention, FIG. 11 a block diagram of a watch-dog device in an embodiment of a small satellite according to the invention, FIG. 12 a schematic representation of a power supply system in an embodiment of a small satellite according to the invention.

In these figures similar elements are numbered with the same reference signs. The figures exhibit only examples and are not to be understood as limiting.

In FIG. 1a a formation 100 of micro satellites 10 is displayed. The formation 100 comprises a variety of several spatially adjacent small satellites 10, where each small satellite is capable of an observation of an Earth's surface 108 within a individual detection area 102 up to Earth's horizon 106. By a combination of the individual detection areas 102 of each small satellite 10, a larger detection area by the formation 104 is covered, which can map a relatively large surface area of the Earth. The center of mass of the formation 100 moves along an orbit 150 $T_S$ above the Earth's surface 108

In this picture the formation 100 is represented as a spatially limited accumulation of small satellites 10 to map a large section of the Earth's surface as detection area by the formation 104 by combination of individual detection areas 102. Thus, large areas of the Earth's surface 108 can be imaged up to the Earth's horizon 106. A bi-directional information exchange 110 of relative attitude/position and trajectory of the individual satellites 10 is established between the individual satellites 10. When individual satellites 10 approach to close or crosses a foreign object 30, then each satellite, but also the entire formation 100 may follow a collision avoidance strategy, controlling direction and individual trajectory in such way, that the foreign object 30 can be avoided. Thus, the orbit 150 $T_S$ may be changed and can be subsequently be corrected again in order to pursue a preselected orbit.

FIG. 1b displays a further formation 100 of small satellites 10 on a polar orbit 150. In this case in a "string of pearls" 154 the small satellites 10 orbit the Earth on an orbit 150, wherein a variety of orbits 150 along the longitude circle may be provided, and thus a variety of string of pearls 154 composed of small satellites 10 orbit Earth. At the poles 152 the small satellites 10 in the individual orbits 150 encounter, causing an increased probability for collisions. In particular, in vicinity of the pole 152 the use of a collision avoidance system 18 is useful to allow targeted avoidance maneuvers to each other of the individual small satellites 10. Here a bi-directional information exchange 110 between the encountering small satellites 10 in the various orbits 150 may be useful in order to achieve a collision avoidance with a minimum of energy expenditure.

FIG. 2 displays a first embodiment of a small satellite in a primarily cubic configuration. The small satellite 10 includes a housing 12, which is composed of six housing walls 46 and a frame of four rods as housing supports 44. Each of the housing walls 46 has two photovoltaic cells 66, which are spaced apart from each other, and in the gap by example object detection sensors 84 in form of optical sensors 86, star sensors or solar sensors can be arranged. Furthermore, the space between the photovoltaic cells 66 offers the possibility, by means of an I/O board 78 to connect to interface ports 82 for contacting and programming or for reading out data before launch. Furthermore at least in a corner region of the box-shaped housing 12 an antenna 88 is foreseen for radio reception, in particular for UHF-reception, which is used to contact to a ground station, but also to adjacent small satellites 10.

At least four edges of the housing 12 are formed by frame rods 44, which define a housing frame. In each frame rod 44 a FEEP thruster 50 can be placed at an end of the rod, wherein each frame rod 44 may have a hollow profile, and in this hollow chamber fuel may be stored for the FEEP thruster. Particularly, the fuel can be cooled before launch, in order to mechanically fill the hollow frame and to contribute to the mechanical stability of the housing frame. In orbit, at the housing frame a heating device can be foreseen to heat the fuel for liquefaction in order to provide fueling for the FEEP thruster 50. Each of the four frame rods 44 forms an independent thruster for the small satellite 10, such that only by controlling a single FEEP thruster 50 both an impulse and a change of attitude direction of the small satellite 10 can be achieved. By simultaneous activation of all FEEP thrusters 50, a linear impulse can be generated along the trajectory $T_x$ of the small satellite 10. On the side of each housing wall 46 oriented inward, magnetic field coils 38 a magnetorquer device 116, as well as a magnetometer may be arranged to measure orientation towards the magnetic field, or an attitude of the magnetic field relative to the attitude of the small satellite 10. Hereby a highly compact design can be realized, that is robust in the launch phase and allows at smallest volume and mass possible an arrangement of all individual functional components in the interior of the satellite.

FIG. 3 illustrates a first example of embodiment of an anti-collision and relative navigation procedure. A small satellite 10 can capture by means object detection sensors 84 a foreign object 30 or a further small satellite 10, wherein at least a relative speed and a relative trajectory can be determined. The foreign object 30 may be, for example, a asteroid or space debris, or, for example parts of a burned out stage of a rocket or parts of artificial celestial bodies. The collision avoidance system 18 generates a collision tube 26 having a diameter $D_k$, which is a multiple of the diameter of the small satellite 10 and thus comprises it. The collision tube 26 further comprises an opening angle α, which can be widened in dependence on the relative speed between the small satellite 10 and a foreign object 30 or an adjacent small satellite 10 to increase or decrease the collision tube. The collision avoidance system 18 determines further the trajectory $T_f$ of the small satellite 10 or of the foreign object 30 and defines a foreign body tube 32 with a diameter $D_f$ comprising on the one hand the size of the foreign object 30 or adjacent small satellites 10 on the other hand comprises also a widening angle which can be adapted depending on the relative velocity between the small satellite 10 and the foreign object, where a high relative velocity and/or a decreasing distance results in an increased angle of the individual tubes.

The collision avoidance system 18 may calculate intersection of collision tube 26 and foreign body tube 32 to detect a danger for collisions. In this case by continuation of the trajectory $T_k$ and under the assumption, that the foreign object continues its specific trajectory $T_f$, a collision can not be excluded. For this reason, the collision avoidance system 18 determines a trajectory correction $T_k$, such that foreign body tube 32 and collision tube 26 do not overlap. In this way, the propulsion system 16, which includes, in particular, a attitude/position control and a thruster control, such that with minimal energy consumption the trajectory correction $T_k$ can realized. By this effectively a collision with foreign bodies 30 can be excluded, which possibly approaches too close to the trajectory of small satellite 10.

FIG. 4 displays a further embodiment of the collision avoidance system 18 of the small satellite 10. The collision avoidance system 18 includes a object detection device 20 to which object detection sensors 84 as by example optical sensors 86 or an antenna 88 can be arranged as a radio or radar sensor. By example the optical sensor 86 may be an optical camera, and/or an infrared camera. The object detection device 20 calculates a collision tube 26 along the orbit, also referred to as trajectory $T_k$. Further, by the object detection sensors 84, a nearby foreign object 30 can be recognized and its trajectory $T_f$ can be determined by observing the relative change in the distance to the foreign object 30. Originating from the knowledge of their own trajectory $T_k$ and the foreign body trajectory $T_f$, the collision tube 26 and a foreign body tube 32 can be determined. In the collision prediction device 22 the collision tube 26 can be compared with the foreign body tube 32 and from intersection of these tubes can be identified which a change of the trajectory $T_k$ is required to avoid a collision.

Recognizes the collision prediction device 22 the danger of a collision, an avoidance device 24 may determine an minimum energy correction of the trajectory $T_{kk}$ by which at the lowest possible energy consumption and direction change a attitude/position and thrust correction will be performed, such that the collision tube 26 does no longer intersect with foreign body tube 32. The avoidance device 24 determines control information for controlling the propulsion and attitude systems 16, particularly a reaction wheel 40 for changing the relative attitude or magnetorquer device 116 to change the pointing to the small satellite 10, and thereafter by means of a FEEP thruster 50 to apply an impulse to the microsatellite 10, such that the trajectory correction $T_{kk}$ is realized. Thus, a collision with adjacent foreign bodies 30 can be avoided. If the foreign object 30 is a further small satellite 10, for example by a bi-directional information exchange 110 between the small satellites 10 relative attitude and trajectory of the small satellites 10 can be exchanged, and a coordinated behavior to avoid a collision between the small satellites 10 can be derived.

FIG. 5 displays an exploded view of the small satellite 10 in FIG. 2. The small satellite 10 comprises six housing walls 46, on which photovoltaic cells 66 are arranged, where between two neighbor photovoltaic cells 66 a central strip-shaped region is recessed to accommodate sensor system. It is possible to arrange in this area the object detection sensors 84 such as a camera or radar sensors. The six housing walls 46 are fixed at four frame rods, where each frame rod 44 includes an arc jet thruster 50 and the fuel is supported in a hollow profile of the frame rod 44. Each frame rod 44 may comprise an electric heater, which allows to heat fuel in the frame rod 44 in order to provide the necessary fuel supply for the operations of the arc jet thruster 50. Inside the small satellite 10, a baseplate board 48 is arranged with sockets on a mating side 80, where plug-in boards 14 are to be inserted. Each plug-in board 14 may handle different tasks and can provide for example the power supply, attitude control, a coordinating process computer or provide a communication function. Further, an I/O-board 78 is plugged into the baseplate board 48 which has I/O-interface ports 82 for external programming and readout of data before launch. The interface ports 82, can exhibit for example an analog and a digital connection to read in and out both analogue and digital data.

FIG. 6 displays, in individual FIGS. 6a to 6d, assembly steps of an embodiment of a small satellite 10 according to the invention. In FIG. 6a, the baseplate board 48 is shown with the mating side 80, on which the individual sockets 54 are arranged, which are connected to each other by a data and power bus 56. At the boundary socket 54 an I/O-board 78 is inserted, which provides two I/O-interface ports 82 for programming access to the small satellite prior to launch. Both, the baseplate board 48 and the I/O-board 78 includes housing wall connectors 58, which are in a position to electrically contact adjacent housing walls 46 to receive by example power from the photovoltaic cells 66 thereon, as well as to contact magnetic field coils which can serve as magnetorquer or as a magnetometer.

In FIG. 6b are further plug-in boards 14 are inserted, in particular an EPS board for provision of a power supply, an ADCS-board for provision of an attitude and propulsion control, a OBDH board for provision of a higher-level computer functionality and a COMM board for provision of a communication capability. Furthermore, a sensor board SENS for provision of a sensor capability is inserted in the baseplate board 48, by example for Earth observation, weather observation and various monitoring functionalities.

In FIG. 6c, a further expansion stage is shown, in which the frame rods 44 are arranged orthogonally to the baseplate board 48 and parallel to the edges of the plug-in board 14. Further, a reaction wheel 40 is visible, which is located on the ADCS board, and an antenna 88 which is connected to the COMM board. The individual functional plug-in boards 14 are mechanically connected to each other by the stabilizing elements 28 in form of a screw.

Finally, FIG. 6d shows the assembly of the housing walls 46, on which photovoltaic cells are arranged, as well as the further object detection sensors 84 and housing wall cut-outs 112 are included, for example for the I/O-interface ports 82. The housing walls 46 provide a regenerative power supply by means of photovoltaic cells 66, and include parts of the attitude control with magnetic field coils 38 of a magnetorquer device 116 on its housing wall back side, as well as magnetometer and sensor elements for monitoring the surrounding area in direction of the trajectory for collision avoidance and for detecting a relative attitude, and star and sun sensors. The direction of trajectory is opposite to the housing side on which the arc jet thruster is arranged.

In FIG. 7, a three panels display the structure of the baseplate board 48 and the I/O-board 78, which forms the backbone of the small satellite 10. The baseplate board 48 has a variety of sockets 54 in which different plug-in boards 14 can be inserted. The sockets 54 are arranged on a mating side 80 of the baseplate board 48. On the bottom side of the baseplate board 48, a data and power bus 56 is arranged, which connects the individual contacts of the socket 54 to each other. On a socket 54 at the edge of the baseplate board 48, an I/O board 78 is inserted. This includes I/O-interface ports 82 for programming and data acquisition from the small satellite 10 before the launch and serves for configuring, coding, and testing the functioning of the electrical system. The baseplate board 48 and the I/O-board 78 exhibit housing wall connectors 58 for electrically contacting the housing walls 46 in order to connect electrically the energy, and sensor, and actuator systems to the housing walls 46.

In FIG. 8, the individual component groups of the small satellite 10 are shown as building blocks. The building blocks are composed of five plug-in boards 14 and a baseplate board 48, which represents the standard configuration of the small satellite 10. The baseplate board 48 has a variety of sockets 54 which are interconnected by a data and power bus 56. The individual plug-in boards 14 are composed of an I/O-board 78 with I/O interface ports 82 for electrically contacting the small satellite system and a OBDH board having two functional cores 34, an EPS board with an accumulator 64 for providing an energy supply, a ADCS board for attitude control and a COMM board with an HF component for sending and receiving data via radio waves. Each of the plug-in boards 14 has an identically configured connector strip 114, which can be plugged into a socket 54 of the baseplate board 48. In addition, four frame rods 44 are arranged, each frame rod integrates an arc jet thruster 50, which is the main propulsion of the small satellite. Further, six housing wall panels 46 are provided, which on their outer side exhibit two photovoltaic cells 66, with space between to offer room for accommodating sensors, in particular object detection sensors 84, and housing wall cut-outs 112 for the contacting of the I/O-interface ports 82. On the back wall of the housing walls 46 magnetic field coils 38 are attached, which can be used both as part of a magnetorquers as well as magnetometer to measure the position of the magnetic field of the earth, and align by means of current flow, the attitude/position of the small satellite with respect to the Earth's magnetic field lines. By housing wall cut-outs 112, the I/O-interface ports 82 can be contacted, as well as sensors pointing outward, which are for example arranged on a plug-in board 14.

In FIG. 9a, the plug-in board for ADCS is shown in more detail. This comprises a reaction wheel 40 with which an impulse for changing the orientation of the small satellite 10 can be generated aligned to its axis direction. For this purpose, a related reaction wheel control unit 122 of the attitude control is provided, which may nevertheless be configured redundantly, and which can be monitored via a watch-dog device 36, such that increased robustness and radiation tolerance of the ADCS system can be made possible. On two opposite edges of the plug-in board 14 are arranged housing wall connectors 58 and the data and power bus 56 of the baseplate board 48 may be contacted via a connector strip 114.

FIG. 9b shows the back of a housing wall 46 which is built in sandwich structure and has in its interior an aluminum core 120 for increasing the stability, for cooling, and for shielding. The aluminum core 120 serves to increase the mechanical rigidity and protects against radiation to a small extent and to dissipate thermal energy. On the front side of the housing wall 46 two photovoltaic cells 66 are arranged, while on the back of a magnetic field coil 38 is disposed, which is connected with a control unit for magnetic coils 118. The control unit for magnetic coils 118 operates the magnetic field coil 38 as magnetorquer device 116 and thus achieves an alignment of the attitude of the small satellite 10 along the Earth's magnetic field, but also operates it as magnetometer to provide a magnetic attitude sensor. At the four corners of the housing wall 46 emerges a mechanically reinforced aluminum core 120 to provide mechanical stability of the housing wall 46, used for both power supply and attitude control of the small satellite 10 by means of the magnetorquer device 116. At least on one longitudinal and one lateral side of the housing wall 46 housing wall connectors 58 are arranged to electrically contact adjacent housing walls 46 as well as the baseplate board 48 and/or an insertion board 14 in the interior.

In the FIG. 10a is a perspective view of a plug-in board 14 of the OBDH is presented, the on-board data handling system, eg. The supervising process computer. The OBDH comprises two functionally equal functional cores 34a, each of which has its individual own storage devices 134a and 134b. A watch-dog device 36 monitors the correct function of two functional cores 34a and 34b, working for example in master-slave operation, and can in hot redundancy operating mode switch between these two functional cores 34a and 34b, as well as reset both functional cores 34a, 34b to ensure reliable operation. The contact to the data and power bus 56 of the baseplate board 48 is realized via a connector strip 114.

In FIG. 10b a block diagram of the functional distribution of the OBDH is presented. The two functional cores 34a and 34b communicate with each other and exchange data and storage information. A supervising watch-dog device 36 monitors the input and output data of the two functional cores 34 and their correct operation and may initiate test sequences to detect indications for an inconsistent behavior of the function cores 34a, 34b. In this case, one or both functional cores 34a, 34b may be rebooted, may for example, be reset with respect to hardware or software, or results of the two functional cores 34a, 34b may be corrected. The functional cores 34a, 34b can be operated in master-slave mode, or individually and autonomously, but may also work synchronously, in parallel and independently of each other. The functional cores 34a, 34b are connected via an interface device 132 to the data and power bus 56. At this data and power bus 56 may further be connected to a storage device 134, time and clock generator device 136, the interface of the housing panel rear wall 138 and a sensor or actuator device 140, such as a propulsion and attitude control system 16, as well as radio or optical sensors. Nevertheless some of these components may also be placed on the plug-in board 14. The functional cores 34a, 34b can of the watch-dog device 36 may functionally be separated from the on-board data system and be restarted. Here, the watch-dog device 36 may operate a FDIR algorithm to achieve a high robustness and radiation tolerance even without conventional shielding techniques against the space radiation.

The watch-dog device 36 can work in several levels and, for example, in a first stage reset by software the individual functional cores. In a second stage a hardware reset can be initiated, for example, by short-term interruption of the power supply of one the functional cores 34 or all functional cores 34a, 34b. In a third step, a monitoring via software of output results of the functional cores 34 take place, such that at different levels increased resiliency can be provided.

FIG. 11 schematically sketches a so-called toggle watch-dog unit (TWU) as a watch-dog device 36 of the small satellite 10. In this case, an output of a functional core 34 is monitored, and if it does not emit an activity signal within a predetermined time frame, it is assumed that the functional core 34 has crashed. In this case, a reset of faulty functional cores 34a or 34b is performed and eventually the master-slave configuration is replaced, such that the current master becomes slave and the previous slave serves as a master function core. By the same logic, the interface device 132 is activated to connect the individual functional cores 34a, 34b to the data and power bus 56. The TWU of the watch-dog device 36 comprises in this case a watch-dog unit 142, an FPGA-unit 144 and a logic gate unit 146 for providing the switching behavior. This makes it possible that the OBDH monitors itself and regenerates itself in a case of failure.

Finally, FIG. 12 presents a power supply device 60 ESP of the small satellite 10. The power supply device 60 comprises a photovoltaic power supply system 124, an accumulator power supply 126 and an energy control subsystem 130. By the divided architecture of the power supply device 60 it is possible to achieve high robustness of the power supply of the individual functional components of the small satellite 10.

The photovoltaic power supply system 124 includes a energy source 62, one or more photovoltaic cells 66. By a variety of DC/DC-voltage converters 68 the energy of the photovoltaic cells 66 is provided at different voltage levels. In this case, energy monitoring devices 72, for example current or voltage monitoring devices 72, can determine the amount of energy delivered by the photovoltaic cells 66. The electric energy is forwarded to accumulator power supply 126. This includes wo or more accumulators 64 arranged on the ESP plug-in board which are charged by the power of the photovoltaic cells 66 in order to provide energy, for example, in the Earth shadowed segment to the power supply device 60. Energy switching devices 74 are provided to switch on and off the accumulators 64. Through a cascade of voltage converters 68 different levels of output voltages can be provided. In this case, the accumulator power supply 126 comprises two accumulators 64 working in parallel, which can provide energy both ways, parallel and independently from each other. The power is passed on three voltage levels to the energy control subsystem 130. Therein more energy switching devices 74 feeding the individual subsystems of the small satellite. Also, from an individual voltage level with a further DC/DC voltage converters 68 other voltage levels can be derived. Thus, different independently working power supply circuits are provided, where energy can be drawn from photovoltaic cells 66 as well as from the accumulators 64. Different voltage levels are provided, such that different subsystems can be supplied by independent and different voltage levels. Numerous energy switching devices 74 and voltage converters 68 bridge even in case of defect related to one voltage level by voltage conversion and switching off of the affected energy circuit. As a result, a continuous operation is guaranteed even in case of malfunction of one or more accumulators 64, or of malfunction of one or more photovoltaic cells 66 or in case of a short circuit of one or more functional elements of small satellite 10.

A small satellite according to the invention can achieve at limited power reserves along lifetime. This is in particular achieved by a multi-level energy supply concept. In the field of redundancy and fault tolerance a "majority voting" can be neglected, as due to advanced FDIR technology only the redundancy of two complementarily working systems can be exploited. For example, memory areas in databases can also be corrected or errors can be detected therein. During run time of the system, switching between the master and slave can be carried out such that without significant delay a switching of a faulty system can be achieved, avoiding any operational disturbances for the small satellite. Using FDIR based watch-dog devices an high operational reliability and radiation hardness is ensured by a number of only two redundant functional cores even without conventional shielding of the small satellite, such that a low mass may be achieved.

A powerful small satellite system capable to fly in formation may be provided at small volume, low mass and low energy. Commercially available electrical components are used, which are not radiation hard. Through a novel propulsion system based on arc jets, in which fuel is accommodated in the housing structural parts, the propulsion system can be minimized. A sophisticated attitude control system that can detect the relative position by means of magnetometers, solar and stellar sensor and gyroscopes, in combination with the propulsion system, may ensure in connection with the inventive collision avoidance system according to the invention a long lifetime in its orbit.

The small satellite is designed as a modular system, similar to the modular system in car production, and can inexpensively and easily be provided for different tasks by a basic configuration. By a high proportion of identical parts low cost per part can be achieved, such that a satellite platform is proposed exhibiting extremely high durability, low cost, and high flexibility in use. Due to the relative navigation and collision avoidance a multi-satellite system can be realized, that can operate autonomously without ground contact in order to achieve the desired tasks. For a radiation shielding no lead plates are necessary and special developments for different satellite tasks can be avoided.

The small satellite system is characterized by its capabilities for self-organisation and a high robustness. By use of industrial standards, such as the energy and data bus standards, industrially available standard components for miniaturized systems and components may be used in difficult extraterrestrial environments with high disturbance levels. The modular system architecture of each component supports flexible integration and production. The individual small satellite can be produced in an automated way for example by means of robots. Through automated testing the functionality and the performance of small satellites before the launch can be guaranteed.

Thus, distributed satellite systems at low-costs for different purposes can be provided. These can be used, for example, for cartography, for positioning tasks or for different tasks in the IT sector. Also, such small satellite formations can be used for commercial enterprises, by example for a fleet management or for a tele-maintenance system or for government tasks, such as early-warning systems, Earth reconnaissance after environmental disasters or military applications. At this satellite formation a high safety and highly miniaturized system is provided, which can especially be applied in telematics systems and in industrial context also for remote diagnosis and remote repair of mobile and stationary plants. Possible applications are, for example, in the automotive industry, the positioning and the autonomous driving of fleets of vehicles, in the global automation and logistics in production, in particular for mobile systems, in the military field remote control and localisation and Earth observation, in the research and space exploration, it provides opportunities for cost-effective testing of innovations under extreme conditions, for data providers by example the analysis of occupancy of parking lots, roads or transport systems are used as an indicator of economic trends or weather service provider can may be potential customers.

LIST OF REFERENCE NUMBERS

10 small satellite capable to fly in formation
12 housing
14 plug-in board
16 propulsion system
18 collision avoidance system
20 object detection device
22 collision prediction device
24 avoidance device
26 collision tube
28 stabilizing element
30 foreign object
32 foreign body tube
34 functional core
36 watch-dog device
38 magnetic field coil
40 reaction wheel
42 casing
44 frame rod
46 housing wall
48 baseplate board
50 propulsion, thruster
52 corner area of the housing
54 socket
56 data and power bus
58 housing wall connector
60 power supply device
62 energy source
64 accumulator
66 photovoltaic cell
68 voltage converter
70 charge controller
72 energy monitoring device
74 energy switching device
76 energy sink
78 I/O-board
80 mating side
82 interface port
84 body detection sensors
86 optical sensor
88 antenna
100 formation of small satellites
102 individual detection area 104 detection area by the formation
106 Earth's horizon
108 Earth's surface
110 bidirectional information exchange
112 housing wall cut-out
114 connector strip
116 magnetorquer device
118 control unit for magnetic coils
120 aluminum core
122 reaction wheel control unit
124 photovoltaic power supply system
126 accumulator power supply
128 voltage control
130 energy control subsystem
132 interface device
134 storage device
136 time and clock generator device
138 interface of the housing panel rear wall
140 sensor or actuator device
142 watch-dog unit
144 FPGA unit
146 logic gate unit
150 orbit
152 pole
154 string of pearls
156 plug contact row for plug-in socket
$T_k$ trajectory of satellite k
$T_{kk}$ trajectory correction
$T_S$ formation trajectory
$T_{Sk}$ formation trajectory correction
COMM communication board
OBDH computer board
EPS power supply board
ADCS position control board
SENS Earth observation sensor board

The invention claimed is:

1. Small satellite capable of flying in formation, said satellite being a nano- or pico-satellite having a mass of 10 kg or less, for LEO applications, comprising a housing and at least one ping-in board arranged in the housing with a predetermined functionality and a propulsion system for generating a directional pulse in the direction of a trajectory $T_k$ in the orbit, wherein the small satellite comprises an autonomously and independently working collision avoidance system which is capable of adapting a trajectory correction $T_{kk}$ of the flight trajectory $T_k$ by the propulsion system when a collision with an active or passive foreign object is expected, wherein the Independent and autonomous collision avoidance system comprises an object detection device coupled to transmitting and receiving sensors, which can be in bi-directional communication with other small satellites capable of flying in formation as active objects to provide, via closed control loops, a self-organizing process, wherein the object detection device comprises at least one or several optical or radio-based body detection sensors for acquisition of a relative attitude and a relative velocity of a foreign body in the direction of a cone-shaped collision tube including the trajectory $T_k$, a collision prediction device for determining a potential risk for collisions in the collision tube, and an avoidance device for controlling the propulsion system with respect to a trajectory correction $T_{kk}$ on the basis of the closed control loops.

2. Small satellite capable of flying in formation according to claim 1, wherein the object detection device autonomously selects a minimum diameter $d_k$ of the collision tube, such that at least the small satellite is included, selecting in such way that at least a multiple of the diameter of the small satellite is included, and the collision prediction device assigns a foreign object tube to the foreign object, and selects a minimum diameter $d_f$ of the foreign object tube in such way; that at least the foreign object therein is included, selecting in such way; that at least a multiple of the diameter of the object is included, wherein preferably an opening angle of the collision tube and/or of the foreign object tube depending on a relative velocity between the small satellite and the foreign object is selected, and the avoidance device determines a trajectory correction $T_{kk}$, while the collision tube overlapping the foreign object tube in an overlap area $A_{kf}$ simulates several trajectory corrections with a cost function and determines a minimal cost trajectory correction $T_{kk}$ and controls the propulsion system to follow the trajectory correction $T_{kk}$.

3. Small satellite capable of flying in formation according to claim 1, wherein the plug-in board comprises a variety of functional cores for providing a predeterminable functionality, in particular an even number of at least two or more comparable functional cores for redundantly providing the functionality, wherein a watch-dog device monitors a correct operation of the functional cores, wherein preferably the watch-dog device monitors the functionality of the functional core by a test function sequence, and the watch-dog device selects a fault-correction activity of one or a group of functional cores for continuous, uninterrupted provision of functionality when detecting a fault.

4. Small satellite capable of flying in formation according to claim 3, wherein the watchdog device implements an FDIR algorithm (Fault Detection, Fault Isolation and Fault Recovery techniques); and in case of failure performs a power reset, a switching between the preferred two functional cores and/or a software reset of at least one of the functional cores.

5. Small satellite capable of flying in formation according to claim 1, wherein the propulsion system comprises at least one reaction wheel and at least two magnetic field coils of a magnetorquer device for the combined attitude control in any direction.

6. Small satellite capable of flying in formation according to claim 5, wherein at least two of a group comprising at least one star sensor, at least one sun sensor, at least one gyroscope, one MEMS gyroscope and/or at least one magnetometer, are arranged on a backside of the plug-in board and/or on one or more housing walls, wherein preferably the reaction wheel is arranged as a miniature reaction wheel for the attitude control correction on the plug-in board.

7. Small satellite capable of flying in formation according to claim 6, wherein preferably the satellite comprises at least one 3D-magnetometer, at least one 3D-gyroscope, at least one 2-axis sun sensors and at least one 2-axis star sensors, wherein preferably the reaction wheel is arranged as a miniature reaction wheel for the attitude control correction on the plug-in board.

8. Small satellite capable of flying in formation according to claim 1, wherein the propulsion system comprises at least one electric propulsion being an arc jet, at least one FEES' (field effect electric propulsion) thruster, arranged in an edge or corner area of the housing, in a housing frame, the housing being cubic in shape.

9. Small satellite capable of flying in formation according to claim 8, wherein the edge area of the housing frame comprises a hollow profile or a profile with a porous internal structure, in which fuel, in particular gallium, ammoniac or hydrazine, is stored for the electric propulsion.

10. Small satellite capable of flying in formation according to claim 8, wherein the propulsion system comprises four FEED thrusters, arranged in an edge or corner area of the cubic housing, in a housing frame.

11. Small satellite capable of flying in formation according to claim 1, wherein in the housing, a housing frame, several housing walls and a baseplate board with at least two plug-in sockets are provided, wherein in the baseplate board the plug-in board is inserted and the plug-in board is in connection via a data and power bus, which supports at least one or more of the communication protocol standards UART, SRI, CAN, Space ire and/or I$^2$ C, further comprising additional plug-in boards, propulsion systems, at least one sensor, actuator devices or a power supply device.

12. Small satellite capable of flying in formation according to claim 1, wherein a baseplate board comprises a multilevel and scalable power supply device, which provides energy by at least one photovoltaic cell and/or at least one accumulator as an energy source, wherein a variety of voltage converters, charge controllers, energy monitoring devices and energy switching devices are provided to detect, distribute and control both energy output from energy sources as well as energy consumption of energy sinks, in particular of plug-in boards or of propulsion systems.

13. Small satellite capable of flying in formation according to claim 12, wherein the baseplate board is planar and an I/O board with at least one analog and/or digital interface port insertable into the mating side of the baseplate board with a variety of plug-in sockets, wherein preferably the mating side includes the data and power bus and the plug-in socket and the baseplate board comprises at its side an interface to the housing wall connector for electrical connection with the housing wall.

14. Small satellite capable of flying in formation according to claim 12, wherein the plug-in board is at least one communication board (COMM), one computer board (OBDH), one energy supply board (EPS), and/or one attitude determination and control board (ARCS), and that at least one housing wall comprises at least one photovoltaic cell, at least one magnetic field coil, at least one optical sensor, and/or one antenna, and that the housing frame comprises at least parts of the propulsion system, in particular at least one FEED thruster.

15. Formation composed of several small satellites capable of flying in formation according to claim 1, wherein a relative position and flight trajectory $T_k$ of each small satellite is modifiable via the independently and autonomously working collision avoidance system.

16. Formation according to claim 15, wherein when exceeding a predeterminable deviation of the flight trajectory $T_k$ of a small satellite by a trajectory correction $T_{kk}$ of a formation trajectory $T_S$, a specific trajectory $T_{kk}$ of the small satellite or a formation trajectory correction $T_{sk}$ of the other small satellites located in the formation for maintaining or realigning the formation trajectory $T_S$ is carried out, wherein preferably the small satellites are in bidirectional exchange of their relative position and/or their orbit trajectory $T_k$.

17. Small satellite capable of flying in formation according to claim 1, wherein the propulsion system comprises an attitude control unit with at least one reaction wheel and at least three magnetic field coils of a magnetorquer device for the combined attitude control in any direction.

18. Small satellite capable of flying in formation according to claim 17, wherein the at least three magnetic field coils includes four or six magnetic field coils of a magnetorquer device for the combined attitude control in any direction.

* * * * *